(12) United States Patent
Matsuo et al.

(10) Patent No.: US 12,479,754 B2
(45) Date of Patent: *Nov. 25, 2025

(54) ALKALI-FREE GLASS AND GLASS PLATE

(71) Applicant: AGC Inc., Tokyo (JP)

(72) Inventors: Yusaku Matsuo, Tokyo (JP); Kazutaka Ono, Tokyo (JP)

(73) Assignee: AGC Inc., Tokyo (JP)

( * ) Notice: Subject to any disclaimer, the term of this patent is extended or adjusted under 35 U.S.C. 154(b) by 994 days.

This patent is subject to a terminal disclaimer.

(21) Appl. No.: 17/492,941

(22) Filed: Oct. 4, 2021

(65) Prior Publication Data

US 2022/0024805 A1 Jan. 27, 2022

Related U.S. Application Data

(63) Continuation of application No. PCT/JP2020/015751, filed on Apr. 7, 2020.

(30) Foreign Application Priority Data

| Apr. 12, 2019 | (JP) | 2019-076423 |
| Jun. 28, 2019 | (JP) | 2019-120828 |
| Nov. 27, 2019 | (JP) | 2019-214690 |

(51) Int. Cl.

| C03C 3/091 | (2006.01) |
| C03B 17/06 | (2006.01) |
| C03C 3/093 | (2006.01) |
| C03C 4/14 | (2006.01) |
| C03C 4/16 | (2006.01) |
| C03C 3/087 | (2006.01) |
| H05K 1/03 | (2006.01) |

(52) U.S. Cl.
CPC ............ *C03C 3/091* (2013.01); *C03B 17/067* (2013.01); *C03C 3/093* (2013.01); *C03C 4/14* (2013.01); *C03C 4/16* (2013.01); C03C 3/087 (2013.01); C03C 2204/00 (2013.01); H05K 1/0306 (2013.01)

(58) Field of Classification Search
CPC .. C03C 3/091; C03C 4/14; C03C 4/16; C03C 4/20

See application file for complete search history.

(56) References Cited

U.S. PATENT DOCUMENTS

| 2003/0232169 A1 | 12/2003 | Kawai | |
| 2005/0065014 A1 | 3/2005 | Narita et al. | |
| 2012/0141668 A1* | 6/2012 | Nakashima | G11B 5/73921 427/128 |
| 2013/0023400 A1 | 1/2013 | Koyama et al. | |
| 2013/0059718 A1 | 3/2013 | Koyama et al. | |
| 2014/0249018 A1 | 9/2014 | Koyama et al. | |
| 2015/0037553 A1 | 2/2015 | Mauro | |
| 2015/0045201 A1 | 2/2015 | Tokunaga et al. | |
| 2015/0218040 A1 | 8/2015 | Koyama et al. | |
| 2017/0327408 A1 | 11/2017 | Nomura et al. | |
| 2017/0355637 A1 | 12/2017 | Nomura et al. | |
| 2019/0084868 A1 | 3/2019 | Nomura et al. | |
| 2019/0161388 A1 | 5/2019 | Nomura et al. | |
| 2019/0210911 A1* | 7/2019 | Ono | C03C 4/16 |
| 2020/0123043 A1 | 4/2020 | Ono et al. | |
| 2021/0013598 A1 | 1/2021 | Nomura et al. | |
| 2021/0163341 A1 | 6/2021 | Ono et al. | |
| 2021/0261456 A1 | 8/2021 | Ono et al. | |
| 2022/0024803 A1* | 1/2022 | Hijiya | C03C 3/093 |
| 2022/0024805 A1 | 1/2022 | Matsuo et al. | |

FOREIGN PATENT DOCUMENTS

| CN | 109153596 A | | 1/2019 |
| JP | 1-201041 A | | 8/1989 |
| JP | H01-201041 A | * | 8/1989 |
| JP | 4-325436 A | | 11/1992 |
| JP | H04-325436 A | * | 11/1992 |
| JP | 7-10588 A | | 1/1995 |
| JP | 9-278465 A | | 10/1997 |
| JP | 2001-151534 A | | 6/2001 |
| JP | 2002-29775 A | | 1/2002 |
| JP | 2005-97090 A | | 4/2005 |
| JP | 2006-347795 A | | 12/2006 |
| JP | 2010-509180 A | | 3/2010 |
| JP | 2011-256060 A | | 12/2011 |
| JP | 2013-216562 A | | 10/2013 |
| JP | 2015-512852 A | | 4/2015 |
| JP | 2022-522986 A | | 4/2022 |
| KR | 10-2008-0085085 A | | 9/2008 |
| KR | 10-2015-0013125 A | | 2/2015 |
| TW | 201639800 A | | 11/2016 |
| WO | WO 89/02877 A1 | | 4/1989 |
| WO | WO 2011/136027 A1 | | 11/2011 |
| WO | WO 2012/060277 A1 | | 5/2012 |
| WO | WO 2013/005402 A1 | | 1/2013 |
| WO | WO 2015/152342 A1 | | 10/2015 |
| WO | WO 2018/025727 A1 | | 2/2018 |
| WO | WO-2018051793 A1 * | | 3/2018 ............. C03B 17/02 |

OTHER PUBLICATIONS

International Search Report issued Jun. 30, 2020 in PCT/JP2020/015751, filed on Apr. 7, 2020, 3 pages.

* cited by examiner

Primary Examiner — Elizabeth A. Bolden
(74) Attorney, Agent, or Firm — Oblon, McClelland, Maier & Neustadt, L.L.P.

(57) ABSTRACT

An alkali-free glass includes, as represented by mole percentage based on oxides, $SiO_2$: 57 to 70%, $Al_2O_3$: 5 to 15%, $B_2O_3$: 15 to 24%, MgO: 0.2 to 10%, CaO: 0.1 to 7%, SrO: 0.1 to 2.5%, BaO: 0 to 10%, and ZnO: 0 to 0.1%, or includes, as represented by mole percentage based on oxides, $SiO_2$: 57 to 70%, $Al_2O_3$: 5 to 15%, $B_2O_3$: 15 to 24%, MgO: 0.1 to 10%, CaO: 0.1 to 10%, SrO: 0.1 to 10%, BaO: 0.1 to 10%, and ZnO: 0 to 0.1%. Formula (A) is $[Al_2O_3]/[B_2O_3]$, and a value of the formula (A) is larger than 0.35 and 1.4 or smaller.

28 Claims, 1 Drawing Sheet

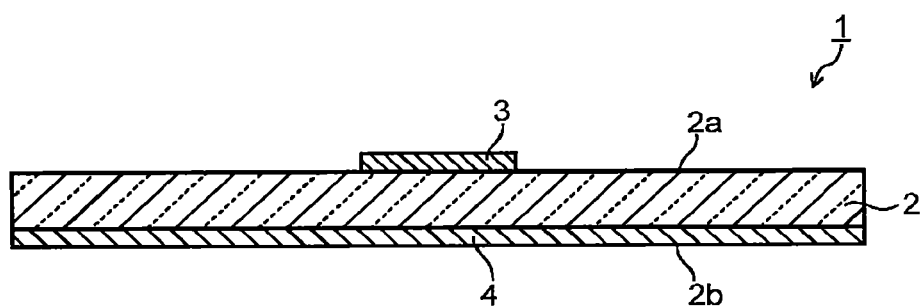

ALKALI-FREE GLASS AND GLASS PLATE

TECHNICAL FIELD

The present invention relates to an alkali-free glass. The present invention further relates to a glass plate, a glass substrate for high-frequency devices, a panel antenna, a window glass, a window glass for vehicles, and a cover glass for touch panels, which each include the alkali-free glass.

BACKGROUND ART

There are electronic devices including communication appliances such as portable telephones, smartphones, portable digital assistants, and Wi-Fi appliances, surface acoustic wave (SAW) devices, radar components, and antenna components. In such electronic devices, increases in signal frequency are being advanced in order to attain increases in communication capacity, increases in transmission speed, etc. Circuit boards for use in electronic appliances for high-frequency applications generally employ insulating substrates such as resin substrates, ceramic substrates, and glass substrates. Such insulating substrates for use in high-frequency devices are required to attain reductions in transmission loss due to dielectric loss, conductor loss, etc., in order to ensure the properties of high-frequency signals, such as quality and intensity.

Of these insulating substrates, the resin substrates are low in rigidity because of the nature thereof. The resin substrates are hence difficult to use in semiconductor package products required to have rigidity (strength). The ceramic substrates have a drawback in that it is difficult to heighten the surface smoothness thereof and, hence, a conductor to be formed on the substrate surface is prone to cause an increase in conductor loss. Meanwhile, the glass substrates are characterized by having high rigidity to facilitate miniaturization, thickness reduction, etc. in packages, and by having excellent surface smoothness and being easily produced as substrates which themselves have increased sizes.

However, although conventional alkali-free glass substrates are effective up to about 20 GHz in reducing dielectric loss and transmission loss due to the dielectric loss, there are limitations in dielectric-loss reduction in a range of higher frequencies exceeding, for example, 30 GHz. It is hence difficult for circuit boards employing the conventional alkali-free glass substrates to maintain the properties, including quality and intensity, of high-frequency signals such as ones having a frequency exceeding 30 GHz. Meanwhile, silica glass substrates can maintain a low dielectric loss even in a range of frequencies exceeding 30 GHz but have too low a coefficient of thermal expansion, resulting in too large a difference in thermal expansion coefficient between the silica glass substrates and other members in configuring electronic devices. This is a factor which reduces the suitability for practical use of the electronic devices.

Patent Document 1 discloses a glass substrate for high-frequency devices which has a dielectric dissipation factor at 35 GHz of 0.0007 or less. Patent Document 1 indicates that the glass substrate for high-frequency devices described therein can have a dielectric dissipation factor of 0.0007 or less because the contents of $Al_2O_3$ and $B_2O_3$ in the glass substrate and the proportion thereof satisfy given requirements.

It is therefore considered that to heighten the content of $B_2O_3$ is effective in reducing the dielectric loss in a high-frequency range above 30 GHz.

CITATION LIST

Patent Literature

Patent Document 1: International Publication WO 2018/051793

SUMMARY OF INVENTION

Technical Problem

However, heightening the content of $B_2O_3$ results in a decrease in the chemical resistance of the glass. In steps for producing a circuit board for a liquid-crystal antenna, a high-frequency device, etc., a glass substrate is subjected to chemical cleaning as a pretreatment in preparation for forming a wiring layer on the glass substrate. If the glass has poor chemical resistance, some of the glass surface is dissolved away, for example, during acid cleaning and the surface smoothness of the substrate is impaired thereby, resulting in a possibility that a film to be formed on the substrate surface might have reduced adhesion. In addition, it is possible that the substance which has been dissolved out adheres to the substrate surface, and this adhesion may increase the conductor loss due to the conductor to be formed on the substrate surface.

An object of the present invention is to provide an alkali-free glass which combines a low dielectric dissipation factor in a high-frequency range and acid resistance.

Solution to Problem

The present inventors diligently made investigations and, as a result, have discovered that the object can be achieved by employing the following configurations.

[1] An alkali-free glass which includes, as represented by mole percentage based on oxides,
$SiO_2$: 57 to 70%,
$Al_2O_3$: 5 to 15%,
$B_2O_3$: 15 to 24%,
MgO: 0.2 to 10%,
CaO: 0.1 to 7%,
SrO: 0.1 to 2.5%,
BaO: 0 to 10%, and
ZnO: 0 to 0.1%,
and in which formula (A) is $[Al_2O_3]/[B_2O_3]$, and a value of the formula (A) is larger than 0.35 and 1.4 or smaller.

[2] An alkali-free glass which includes, as represented by mole percentage based on oxides,
$SiO_2$: 57 to 70%,
$Al_2O_3$: 5 to 15%,
$B_2O_3$: 15 to 24%,
MgO: 0.1 to 10%,
CaO: 0.1 to 10%,
SrO: 0.1 to 10%,
BaO: 0.1 to 10%, and
ZnO: 0 to 0.1%,
and in which formula (A) is $[Al_2O_3]/[B_2O_3]$, and a value of the formula (A) is larger than 0.35 and 1.4 or smaller.

[3] The alkali-free glass according to [1] or [2] above wherein formula (B) is [MgO]+[CaO]+[SrO]+[BaO], and a value of the formula (B) is 7% or larger and 16% or less.

[4] The alkali-free glass according to any one of [1] to [3] above wherein the value of the formula (B) is 8% or larger and 16% or less.

[5] The alkali-free glass according to any one of [1] to [4] above wherein formula (C) is $[Al_2O_3]-([MgO]+[CaO]+[SrO]+[BaO])$, and a value of the formula (C) is larger than −3% and less than 2%.

[6] The alkali-free glass according to any one of [1] to [5] above wherein the value of the formula (A) is 0.49 or larger.

[7] The alkali-free glass according to any one of [1] to [5] above wherein formula (D) is $[SrO]/([MgO]+[CaO]+[SrO]+[BaO])$, and a value of the formula (D) is 0.64 or larger.

[8] The alkali-free glass according to any one of [1] to [7] above which contains 1 mol % or less of Fe in terms of $Fe_2O_3$.

[9] The alkali-free glass according to any one of [1] to [8] above which has a β-OH value of 0.05 $mm^{-1}$ or larger and 1.0 $mm^{-1}$ or less.

[10] The alkali-free glass according to any one of [1] to [9] above which has a total content represented by $[Li_2O]+[Na_2O]+[K_2O]$ of 0 to 0.2 mol %.

[11] The alkali-free glass according to any one of [1] to [10] above which contains at least one selected from the group consisting of $SnO_2$, Cl, and $SO_3$, in a total amount of 1 mol % or less.

The alkali-free glass according to any one of [1] to [11] above which contains at least one selected from the group consisting of $Sc_2O_3$, $TiO_2$, ZnO, $Ga_2O_3$, $GeO_2$, $Y_2O_3$, $ZrO_2$, $Nb_2O_5$, $In_2O_3$, $TeO_2$, $HfO_2$, $Ta_2O_5$, $WO_3$, $Bi_2O_3$, $La_2O_3$, $Gd_2O_3$, $Yb_2O_3$, and $Lu_2O_3$, in a total amount of 1 mol % or less.

[13] The alkali-free glass according to any one of [1] to [12] above which contains 1 mol % or less of F.

[14] The alkali-free glass according to any one of [1] to [13] above which has a dielectric dissipation factor at 35 GHz of 0.006 or less.

[15] The alkali-free glass according to any one of [1] to [14] above which has a resistance value at 1,500° C. of 400 Ω·cm or less.

[16] The alkali-free glass according to any one of [1] to [15] above which has a resistance value at 1,500° C. of 300 Ω·cm or less.

[17] The alkali-free glass according to any one of [1] to [16] above which has a Young's modulus of 58 GPa or higher.

[18] The alkali-free glass according to any one of [1] to [17] above which has a density of 2.58 $g/cm^3$ or less and an average coefficient of thermal expansion at 50-350° C. of $30\times10^{-7}$/° C. to $40\times10^{-7}$/° C.

[19] The alkali-free glass according to any one of [1] to [18] above which has a temperature $T_2$ at which a glass viscosity is $10^2$ dPa·s of 1,500 to 1,700° C. and has a temperature $T_4$ at which a glass viscosity is $10^4$ dPa·s of 1,290° C. or lower.

[20] The alkali-free glass according to any one of [1] to [19] above which has a glass transition temperature of 700° C. or lower or a strain point of 700° C. or lower.

[21] The alkali-free glass according to any one of [1] to [20] above which has a surface devitrification temperature of 1,300° C. or lower.

[22] The alkali-free glass according to any one of [1] to [21] above which has a glass component extraction amount per unit surface area of 0.025 $mg/cm^2$ or less when the alkali-free glass is immersed for 170 seconds in a 45° C. aqueous solution containing 6 wt % $HNO_3$ and 5 wt % $H_2SO_4$.

[23] A glass plate which includes the alkali-free glass according to any one of [1] to [22] above and has principal surfaces and an edge surface, at least one of the principal surfaces having an arithmetic mean roughness Ra of 1.5 nm or less.

[24] The glass plate according to [23] above in which at least one side has a dimension of 900 mm or longer and which has a thickness of 0.7 mm or less.

[25] The glass plate according to [22] or [23] above produced by a float process or a fusion process.

[26] A glass substrate for high-frequency devices which includes the alkali-free glass according to any one of [1] to [22] above.

[27] A panel antenna which includes the alkali-free glass according to any one of [1] to [22] above.

[28] A window glass which includes the alkali-free glass according to any one of [1] to [22] above.

[29] A window glass for vehicles which includes the alkali-free glass according to any one of [1] to [22] above.

[30] A cover glass for touch panels which includes the alkali-free glass according to any one of [1] to [22] above.

Advantageous Effects of Invention

The alkali-free glass of the present invention can reduce the dielectric loss of high-frequency signals. This alkali-free glass is hence suitable for use as glass substrates for high-frequency devices. Circuit boards employing such glass substrates can reduce the transmission loss of high-frequency signals and can provide practical high-frequency devices, e.g., electronic devices.

The alkali-free glass of the present invention has excellent acid resistance. This alkali-free glass is hence free from the possibility that when a glass substrate is acid-cleaned in steps for producing a circuit board for a liquid-crystal antenna, a high-frequency device, etc., some of the substrate surface might be dissolved away, resulting in impaired surface smoothness of the substrate or in adhesion of the dissolved substance to the substrate surface. Because of this, a film to be formed on the substrate surface can be prevented from having reduced adhesion. Furthermore, the film can be prevented from having an increased conductor loss.

The alkali-free glass of the present invention can reduce the transmission loss of radio waves within a high-frequency band, and is less apt to be damaged of break. Consequently, this alkali-free glass is suitable also for glass products for sending and receiving radio waves within a high-frequency band.

BRIEF DESCRIPTION OF DRAWING

The FIGURE is a diagrammatic cross-sectional diagram illustrating one example of the configuration of a circuit board for high-frequency devices.

DESCRIPTION OF EMBODIMENTS

Embodiments of the present invention are explained below. In the following explanations, each numerical range shown using "-" includes the numerical values that precede and succeed the "-" as a minimum value and a maximum value. The contents of components in an alkali-free glass or glass plate are given as represented by mole percentage (mol %) based on oxides unless otherwise indicated. In formulae (A) to (D), the expression [metal oxide], e.g., [MgO], indicates the mol % of the metal oxide component, e.g., magnesium oxide.

In this description, the term "high frequency" means frequencies of 10 GHz or higher, preferably frequencies higher than 30 GHz, more preferably 35 GHz or higher.

The alkali-free glass (hereinafter often referred to simply as "glass") according to this embodiment is explained below.

In the case where the content of $SiO_2$, which is a network-forming substance, is 57 mol % (hereinafter simply expressed by %) or higher, satisfactory glass-forming ability can satisfactory weatherability can be attained and devitrification can be inhibited. The content of $SiO_2$ is preferably 58% or higher, more preferably 60% or higher, still more preferably 610% or higher. Meanwhile, in the case where the content of $SiO_2$ is 70% or less, satisfactory glass meltability can be attained. The content of $SiO_2$ is preferably 68% or less, more preferably 66% or less, still more preferably 65% or less, especially preferably 64% or less, most preferably 63% or less.

$Al_2O_3$ is a component effective in improving the weatherability, improving the Young's modulus, inhibiting the glass from suffering phase separation, reducing the coefficient of thermal expansion, and so on. In the case where the content of $Al_2O_3$ is 5% or higher, the effects of the inclusion of $Al_2O_3$ are sufficiently obtained. The content of $Al_2O_3$ is preferably 6% or higher, more preferably 7% or higher, still more preferably 8% or higher. Meanwhile, in the case where the content of $Al_2O_3$ is 15% or less, the glass has satisfactory properties including meltability. The content of $Al_2O_3$ is preferably 14% or less, more preferably 13% or less, still more preferably 12% or less.

In the case where the content of $B_2O_3$ is 24% or less, satisfactory chemical resistance can be attained. The content of $B_2O_3$ is preferably 23% or less, more preferably 22% or less, still more preferably 21% or less, yet still more preferably 20% or less, especially preferably 19% or less, most preferably 18% or less. Meanwhile, in the case where the content of $B_2O_3$ is 15% or higher, the glass has improved meltability. In addition, the glass can have a reduced dielectric dissipation factor in a high-frequency range. The content of $B_2O_3$ is preferably 16% or higher, more preferably 17% or higher, still more preferably 17.5% or higher.

MgO is a component which increases the Young's modulus without increasing the specific gravity. That is, MgO is a component which heightens the specific modulus. MgO hence is effective in mitigating the problem of deflection and improves the fracture toughness to heighten the glass strength. Furthermore, MgO is a component which improves the meltability also. In the case where the content of MgO is 0.1% or higher, the effects of the inclusion of MgO are obtained and the glass can be inhibited from having too low a coefficient of thermal expansion. The content of MgO is preferably 0.2% or higher, more preferably 1% or higher, still more preferably 2% or higher. In the case where the content of MgO is 10% or less, the glass is inhibited from having an elevated devitrification temperature. The content of MgO is preferably 9% or less, more preferably 8% or less, still more preferably 7% or less, yet still more preferably 6% or less, particularly preferably 5% or less, especially preferably 4% or less, most preferably 3% or less.

CaO is characterized by being next to MgO among the alkaline-earth metals in heightening the specific modulus and by not excessively lowering the strain point, and is a component which improves the meltability like MgO. Furthermore, CaO is a component characterized by being less prone to heighten the devitrification temperature than MgO. In the case where the content of CaO is 0.1% or higher, the effects of the inclusion of CaO are sufficiently obtained. The content of CaO is preferably 0.2% or higher, more preferably 0.5% or higher, still more preferably 1% or higher, especially preferably 2% or higher. Meanwhile, in the case where the content of CaO is 10% or less, not only the glass is prevented from having too high an average coefficient of thermal expansion but also the glass is inhibited from having an elevated devitrification temperature and is thereby prevented from devitrifying when produced. The content of CaO is preferably 8% or less, more preferably 7% or less, still more preferably 6% or less, yet still more preferably 5% or less, particularly preferably 4% or less, especially preferably 3% or less.

SrO is a component which improves the meltability without heightening the devitrification temperature of the glass. In the case where the content of SrO is 0.1% or higher, the effect of the inclusion of SrO is sufficiently obtained. The content of SrO is preferably 0.2% or higher, more preferably 0.5% or higher, still more preferably 1% or higher, especially preferably 2% or higher. In the case where the content of SrO is 10% or less, the glass is inhibited from having too high an average coefficient of thermal expansion, without having too high a specific gravity. The content of SrO is preferably 9% or less, more preferably 8% or less, still more preferably 7% or less, yet still more preferably 6% or less, particularly preferably 5% or less, in particular 4% or less, especially preferably 3% or less, most preferably 2.5% or less.

BaO, although not essential, is a component which improves the meltability without heightening the devitrification temperature of the glass. In the case where the content of BaO, if it is contained, is 0.1% or higher, the effect of the inclusion thereof is sufficiently obtained; such BaO contents are hence preferred. The content of BaO is preferably 0.2% or higher, more preferably 10% or higher, especially preferably 2% or higher. However, too high BaO contents tend to result in too high a specific gravity, too low a Young's modulus, too high a relative permittivity, or too high an average coefficient of thermal expansion. Because of this, the content of BaO is preferably 10% or less, more preferably 8% or less, still more preferably 5% or less, yet still more preferably 3% or less.

ZnO, although not essential, is a component which improves the chemical resistance. However, ZnO contained in too large an amount is prone to result in phase separation and may heighten the devitrification temperature. Because of this, the content of ZnO is 0.1% or less. The content of ZnO is preferably 0.05% or less, more preferably 0.03% or less, still more preferably 0.01% or less. Especially preferably, the glass contains substantially no ZnO. In the present invention, the expression "containing substantially no ZnO" means that the content thereof is, for example, less than 0.01%.

The alkali-free glass according to this embodiment has a value of formula (A), which is the content ratio represented by $[Al_2O_3]/[B_2O_3]$, of larger than 0.35 and 1.4 or smaller. In the case where the value of formula (A) is within that range, a reduction in dielectric loss in a high-frequency range above 30 GHz can be attained and the glass has improved acid resistance. In addition, phase separation is inhibited and the glass has excellent evenness. In case where the value represented by formula (A) is 0.35 or smaller, the glass has poor acid resistance. In addition, a glass having excellent evenness is difficult to obtain due to phase separation. In case where the value represented by formula (A) exceeds 1.4, it is impossible to attain a reduction in dielectric loss in a high-frequency range above 30 GHz. The value represented by formula (A) is preferably 1.2 or smaller, more preferably 1.0 or smaller, still more preferably 0.8 or smaller. The value represented by formula (A) is preferably 0.40 or larger, more preferably 0.45 or larger, still more preferably 0.49 or larger.

In the case where the value represented by formula (A) is 0.49 or larger, the glass has an improved Young's modulus of, for example, 64 GPa or higher; such values of formula (A) are hence preferred. The value represented by formula (A) is yet still more preferably 0.52 or larger, particularly preferably 0.56 or larger, especially preferably 0.59 or larger, most preferably 0.61 or larger.

The alkali-free glass according to this embodiment preferably has a value represented by formula (B), which is the total content represented by [MgO]+[CaO]+[SrO]+[BaO], of 7% or higher and 16% or less. In the case where the value represented by formula (B) is within that range, the glass has a reduced resistance value at a temperature in a melting temperature range, e.g., 1,500° C., and has improved acid resistance. The alkali-free glass according to this embodiment, which has a low resistance value in a melting temperature range, is advantageous in that by using electric melting for melting raw materials for glass, the efficiency of producing the alkali-free glass and the quality thereof can be improved. Specifically, in the case where the value represented by formula (B) is 7% or higher, the resistance value in a melting temperature range can be reduced. In the case where the value represented by formula (B) is 16% or less, the glass can be made to have better acid resistance. In addition, the dielectric loss in a high-frequency range above 30 GHz can be satisfactorily reduced. The value represented by formula (B) is more preferably 14% or less, still more preferably 13% or less, yet still more preferably 12% or less, especially preferably 11% or less, most preferably 10.5% or less. The value represented by formula (B) is more preferably 8% or higher, still more preferably 8.5% or higher, yet still more preferably 9% or higher.

The alkali-free glass according to this embodiment preferably has a value represented by formula (C), which is the content represented by [$Al_2O_3$]—([MgO]+[CaO]+[SrO]+[BaO]), of larger than −3% and less than 2%. In the case where the value represented by formula (C) is within that range, the glass can be inhibited from devitrifying and has improved acid resistance. Specifically, in the case where the value represented by formula (C) is larger than −3%, the glass can have better acid resistance. In the case where the value represented by formula (C) is less than 2%, the glass is less apt to devitrify. The value represented by formula (C) is more preferably 1.5% or less, still more preferably 1.0% or less, especially preferably 0.5% or less. The value represented by formula (C) is more preferably −2% or larger, still more preferably −1% or larger, especially preferably −0.5% or larger.

The alkali-free glass according to this embodiment preferably has a value of formula (D), which is the content ratio represented by [SrO]/([MgO]+[CaO]+[SrO]+[BaO]), of 0.64 or larger. In the case where the value represented by formula (D) is within that range, the glass has a lowered surface devitrification temperature of, for example, 1,219° C. or below, resulting in improved glass production efficiency. The value of formula (D) is more preferably 0.7 or larger, still more preferably 0.75 or larger, especially preferably 0.8 or larger. Although there is no particular upper limit, the value of formula (D) is, for example, preferably 0.95 or smaller.

The alkali-free glass according to this embodiment may be made to contain Fe in order to reduce the resistance value at a temperature in a melting temperature range, e.g., 1,500° C. However, the content of Fe in terms of $Fe_2O_3$ is preferably 1 mol % or less, more preferably 0.5 mol % or less, still more preferably 0.1 mol % or less, from the standpoint of inhibiting the transmittance in the visible region from decreasing.

The alkali-free glass according to this embodiment preferably has a β-OH value ($mm^{-1}$) of 0.05 $mm^{-1}$ or higher and 1.0 $mm^{-1}$ or less.

The β-OH value, which is an index to the water content of the glass, is determined by examining a glass sample for absorbance for light having wavelengths of 2.75-2.95 μm and dividing a maximum absorbance $β_{max}$ by the thickness (mm) of the sample. In the case where the n-OH value is within that range, the glass has a reduced resistance value at a temperature in a temperature range where raw materials for glass are melted, for example, at around 1,500° C. Such β-OH values are suitable for glass melting by heating by voltage application and are effective in diminishing bubble defects in the glass. Specifically, in the case where the β-OH value is 0.05 $mm^{-1}$ or higher, the glass has a reduced resistance value at a temperature in a temperature range where raw materials for glass are melted. In addition, such β-OH values enable the glass to have a satisfactorily reduced dielectric dissipation factor in a high-frequency range. In the case where the β-OH value is 1.0 $mm^{-1}$ or less, the glass can be inhibited from having bubble defects therein. The β-OH value thereof is more preferably 0.8 $mm^{-1}$ or less, still more preferably 0.6 $mm^{-1}$ or less, especially preferably 0.5 $mm^{-1}$ or less. The β-OH value thereof is more preferably 0.1 $mm^{-1}$ or higher, still more preferably 0.2 $mm^{-1}$ or higher, especially preferably 0.3 $mm^{-1}$ or higher.

The alkali-free glass according to this embodiment preferably contains substantially no alkali metal oxides, e.g., $Li_2O$, $Na_2O$, and $K_2O$. In this embodiment, the expression "containing substantially no alkali metal oxides" means that the glass does not contain any alkali metal oxide except unavoidable impurities which have come into the glass from raw materials, etc., that is, said expression means that no alkali metal oxides have been incorporated on purpose. However, alkali metal oxides may be incorporated in a given amount for the purpose of obtaining a specific effect, specifically the effect of lowering the strain point, lowering the Tg, lowering the annealing point, or reducing the resistance value in a temperature range for melting raw materials for glass, etc.

Specifically, the glass may contain at least one alkali metal oxide selected from the group consisting of $Li_2O$, $Na_2O$, and $K_2O$ in an amount of 0.2% or less in terms of the total content represented by [$Li_2O$]+[$Na_2O$]+[$K_2O$]. The total content thereof is more preferably 0.15% or less, still more preferably 0.10% or less, yet still more preferably 0.08% or less, particularly preferably 0.05% or less, most preferably 0.03% or less. The glass may contain at least one alkali metal oxide selected from the group consisting of $Li_2O$, $Na_2O$, and $K_2O$ in a total content of 0.001% or higher as represented by mole percentage based on oxides. The total content thereof is more preferably 0.003% or higher, still more preferably 0.005% or higher, yet still more preferably 0.008% or higher, particularly preferably 0.01% or less, most preferably 0.02% or higher. In this description, the total content represented by [Li$_2$O]+[Na$_2$O]+[K$_2$O] is sometimes expressed by R$_2$O. R indicates the alkali metals.

The alkali-free glass according to this embodiment may contain at least one selected from the group consisting of SnO$_2$, Cl, and SO$_3$ for improving the refinability of the glass, in a total content of preferably 1 mol % or less, more preferably 0.5 mol % or less, still more preferably 0.3 mol % or less. A lower limit is 0% (the glass contains none of these).

From the standpoints of diminishing bubble defects in the glass and reducing the dielectric dissipation factor in a high-frequency range, the alkali-free glass according to this embodiment has a content of Cl of preferably 0.5 mol % or less, more preferably 0.4 mol % or less, still more preferably 0.3 mol % or less, yet still more preferably 0.2 mol % or less, especially preferably 0.1 mol % or less. A lower limit is 0% (the glass contains substantially no Cl).

The alkali-free glass according to this embodiment may contain at least one minor component selected from the group consisting of Sc$_2$O$_3$, TiO$_2$, ZnQ, Ga$_2$O$_3$, GeO$_2$, Y$_2$O$_3$, ZrO$_2$, Nb$_2$O$_5$, In$_2$O$_3$, TeO$_2$, HfO$_2$, Ta$_2$Os, WO$_3$, Bi$_2$O$_3$, La$_2$O$_3$, Gd$_2$O$_3$, Yb$_2$O$_3$, and Lu$_2$O$_3$ for improving the acid resistance of the glass. However, in the case where the content of such minor components is too high, the glass has reduced evenness and is prone to suffer phase separation. Consequently, the total content of such minor components is preferably 1 mol % or less. Only one of those minor components may be contained, or two or more thereof may be contained.

The alkali-free glass according to this embodiment may be made to contain F in an amount up to 1 mol % for the purposes of improving the meltability of the glass, lowering the strain point of the glass, lowering the glass transition temperature, lowering the annealing point, etc. Contents of F exceeding 1 mol % result in a possibility that the glass might have an increased number of bubble defects therein.

In order to improve the meltability, refinability, formability, etc. of the glass or in order to obtain absorption at specific wavelengths or improve the density, hardness, flexural rigidity, durability, etc., the alkali-free glass according to this embodiment may be made to contain one or more selected from Se$_2$O$_3$, TeO$_2$, Ga$_2$O$_3$, In$_2$O$_3$, GeO$_2$, CdO, BeO, and Bi$_2$O$_3$. The total content of these components is preferably 2% or less, more preferably 1% or less, still more preferably 0.5% or less, yet still more preferably 0.3% or less, particularly preferably 0.1% or less, especially preferably 0.05% or less, most preferably 0.01% or less.

In order to improve the meltability, refinability, formability, etc. of the glass or in order to improve the hardness, e.g., Young's modulus, etc. of the glass, the alkali-free glass according to this embodiment may be made to contain rare-earth oxides and transition-metal oxides.

The alkali-free glass according to this embodiment may contain one or more rare-earth oxides selected from Sc$_2$O$_3$, Y$_2$O$_3$, La$_2$O$_3$, Ce$_2$O$_3$, Pr$_2$O$_3$, Nd$_2$O$_3$, Pm$_2$O$_3$, Sm$_2$O$_3$, Eu$_2$O$_3$, Gd$_2$O$_3$, Tb$_2$O$_3$, Dy$_2$O$_3$, Ho$_2$O$_3$, Re$_2$O$_3$, Tm$_2$O$_3$, Yb$_2$O$_3$, and Lu$_2$O$_3$. The total content of these is preferably 2% or less, more preferably 1% or less, still more preferably 0.5% or less, yet still more preferably 0.3% or less, particularly preferably 0.1% or less, especially preferably 0.05% or less, most preferably 0.01% or less.

The alkali-free glass according to this embodiment may contain one or more transition-metal oxides selected from V$_2$O$_5$, Ta$_2$O$_3$, Nb$_2$O$_5$, WO$_3$, MoO$_3$, and HfO$_2$. The total content of these is preferably 2% or less, more preferably 10% or less, still more preferably 0.5% or less, yet still more preferably 0.3% or less, particularly preferably 0.1% or less, especially preferably 0.05% or less, most preferably 0.01% or less.

In order to improve the meltability, etc. of the glass, the alkali-free glass according to this embodiment may be made to contain ThO$_2$, which is an actinide oxide. The content of ThO$_2$ is preferably 2% or less, more preferably 1% or less, still more preferably 0.5% or less, yet still more preferably 0.3% or less, particularly preferably 0.1% or less, in particular 0.05% or less, especially preferably 0.01% or less, most preferably 0.005% or less.

The alkali-free glass according to this embodiment preferably has a dielectric dissipation factor (tan δ) at 35 GHz of 0.006 or less. In the case where the dielectric dissipation factor at 35 GHz thereof is 0.006 or less, this glass can attain a reduction in dielectric loss in a high-frequency range above 30 GHz. The dielectric dissipation factor at 35 GHz thereof is more preferably 0.0054 or less, still more preferably 0.005 or less, yet still more preferably 0.0045 or less, particularly preferably 0.004 or less, especially preferably 0.003 or less.

Meanwhile, the dielectric dissipation factor at 10 GHz thereof is preferably 0.006 or less, more preferably 0.005 or less, still more preferably 0.004 or less, most preferably 0.003 or less.

The alkali-free glass according to this embodiment preferably has a relative permittivity at 35 GHz of 10 or less. In the case where the relative permittivity at 35 GHz thereof is 10 or less, this glass can attain a reduction in dielectric loss in a high-frequency range. The relative permittivity at 35 GHz thereof is more preferably 7 or less, still more preferably 6 or less, especially preferably 5 or less.

Meanwhile, the relative permittivity at 10 GHz thereof is preferably 5.5 or less, more preferably 5.3 or less, still more preferably 5 or less.

In the case where alkali-free glasses are for use as glass substrates to be employed in high-frequency devices, these glasses are required to have a high Young's modulus. If the glasses have a low Young's modulus, the glass substrates may arouse troubles such as warpage, deflection, or cracking after metal (e.g., Cu) film deposition performed in device production steps. Alkali-free glasses having a reduced dielectric dissipation factor tend to have a reduced Young's modulus.

The alkali-free glass according to this embodiment preferably has a Young's modulus of 58 GPa or higher. In the case where the Young's modulus thereof is within that range, it is possible to mitigate the trouble in which the glass substrate, for example, warps, deflects, or cracks after the deposition of a metal film, e.g., Cu film, performed in steps for producing a high-frequency device. The Young's modulus thereof is more preferably 60 GPa or higher, still more preferably 62 GPa or higher, yet still more preferably 63 GPa or higher, particularly preferably 64 GPa or higher, even particularly preferably 65 GPa or higher, in particular 66 GPa or higher, especially preferably 67 GPa or higher, most preferably 68 GPa or higher.

The alkali-free glass according to this embodiment has a specific modulus of preferably 23 GPa·cm$^3$/g or higher, more preferably 24 GPa·cm$^3$/g or higher, still more preferably 25 GPa·cm$^3$/g or higher, from the standpoint of inhibiting the glass from deflecting. Although there is no particular upper limit, the specific modulus thereof is, for example, preferably 32 GPa·cm$^3$/g or less.

The alkali-free glass according to this embodiment preferably has a density of 2.58 g/cm$^3$ or less. This reduces self-weight deflection and facilitates handling of large substrates. In addition, devices employing this glass can be reduced in weight. The density thereof is preferably 2.57 g/cm³ or less, more preferably 2.56 g/cm³ or less. The term "large substrate" means, for example, a substrate in which at least one side has a dimension of 900 mm or larger.

The alkali-free glass according to this embodiment preferably has an average coefficient of thermal expansion at 50-350° C. of $30 \times 10^{-7}$/° C. or higher. Due to this, the alkali-free glass, when used as a glass substrate, can be inhibited from cracking because of too large a difference in expansion coefficient between the glass substrate and a metal film formed thereon.

The average coefficient of thermal expansion thereof at 50-350° C. is more preferably $33 \times 10^{-7}$/° C. or higher, still more preferably $35 \times 10^{-7}$/° C. or higher, yet still more preferably $36 \times 10^{-7}$/° C. or higher, especially preferably $37 \times 10^{-7}$/° C. or higher, most preferably $38 \times 10^{-7}$/° C. or higher.

Meanwhile, the average coefficient of thermal expansion thereof at 50-350° C. is preferably $43 \times 10^{-7}$/° C. or less, from the standpoint of inhibiting the glass from cracking in steps for producing products such as high-frequency devices.

The average coefficient of thermal expansion thereof at 50-350° C. is more preferably $42 \times 10^{-7}$/° C. or less, still more preferably $41.5 \times 10^{-7}$/° C. or less, yet still more preferably $41 \times 10^{-7}$/° C. or less, particularly preferably $40.5 \times 10^{-7}$/° C. or less, especially preferably $40.3 \times 10^{-7}$/° C. or less, most preferably $40 \times 10^{-7}$/° C. or less.

The alkali-free glass according to this embodiment preferably has a temperature $T_2$, at which the glass has a viscosity of $10^2$ dPa·s, of 1,700° C. or lower. In the case where the $T_2$ thereof is 1,700° C. or lower, this glass has excellent meltability and the burden to be imposed on the production apparatus can be lessened. For example, the life of an apparatus such as the glass-melting tank can be prolonged and the production efficiency can be improved. Furthermore, tank-derived defects such as lump defects and Zr defects can be diminished. The $T_2$ thereof is more preferably 1,680° C. or lower, still more preferably 1,670° C. or lower. The $T_2$ thereof is preferably 1,500° C. or higher.

The alkali-free glass according to this embodiment preferably has a temperature $T_4$, at which the glass has a viscosity of $10^4$ dPa·s, of 1,290° C. or lower. Thus, the glass has excellent formability. Furthermore, a lower temperature can be used for forming the glass, thereby making it possible to reduce the amount of volatilized substances in the atmosphere surrounding the glass and to thereby diminish defects in the glass. Since the glass can be formed at low temperatures, the burden on the production apparatus can be lessened. For example, the life of an apparatus such as a float bath for glass forming can be prolonged and the production efficiency can be improved. The $T_4$ thereof is more preferably 1,280° C. or lower. Although there is no particular lower limit, the $T_4$ thereof is, for example, preferably 1,050° C. or higher.

$T_2$ and $T_4$ can be determined by examining the glass for viscosity using a rotary viscometer in accordance with the method as provided for in ASTM C 965-96 and determining the temperature at which the viscosity is $10^2$ d·Pa·s or $10^4$ d·Pa·s. In the Examples which is given later, NBS710 and NIST717a were used as reference samples for apparatus calibration.

The alkali-free glass according to this embodiment preferably has a glass transition temperature of 700° C. or lower. Thus, the annealing apparatus need not have an elevated temperature and can be inhibited from having a shortened life. The glass transition temperature thereof is more preferably 680° C. or lower, still more preferably 670° C. or lower. The glass transition temperature thereof is preferably 600° C. or higher. Thus, the glass plate, when processed at high temperatures in high-frequency device production steps, can be inhibited from deforming or contracting (thermal shrinkage). The glass transition temperature thereof is more preferably 620° C. or higher, especially preferably 630° C. or higher.

The alkali-free glass according to this embodiment has excellent formability when having a lower strain point. The strain point thereof is preferably 700° C. or lower, more preferably 670° C. or lower, still more preferably 660° C. or lower. Although there is no particular lower limit on the strain point, the strain point thereof is, for example, preferably 550° C. or higher.

The alkali-free glass according to this embodiment preferably has a surface devitrification temperature of 1,300° C. or lower. Thus, the glass has excellent formability. This glass can be inhibited from arousing a trouble in which crystals precipitate within the glass during forming to lower the transmittance. In addition, the burden on the production apparatus can be lessened. For example, the life of an apparatus such as a float bath for glass forming can be prolonged and the production efficiency can be improved.

The surface devitrification temperature thereof is preferably 1,295° C. or lower, 1,290° C. or lower, 1,285° C. or lower, 1,280° C. or lower, 1,275° C. or lower, 1,270° C. or lower, 1,265° C. or lower, 1,260° C. or lower, 1,255° C. or lower, 1,250° C. or lower, 1,245° C. or lower, 1,240° C. or lower, 1,235° C. or lower, 1,230° C. or lower, 1,225° C. or lower, 1,220° C. or lower, 1,215° C. or lower, 1,210° C. or lower, 1,205° C. or lower, and 1,200° C. or lower in order of increasing preference. Although there is no particular lower limit, the surface devitrification temperature thereof is, for example, preferably 1,000° C. or higher.

The surface devitrification temperature in this embodiment can be determined in the following manner. Particles of a crushed glass are placed on dishes made of platinum and heat-treated for 17 hours in electric furnaces having constant temperatures. After the heat treatment, the sample is examined with an optical microscope to determine a highest temperature which has resulted in crystal precipitation in the surface of the glass and a lowest temperature which has not resulted in crystal precipitation. An average of the highest and the lowest temperatures is taken as the surface devitrification temperature.

The alkali-free glass according to this embodiment, when immersed for 170 seconds in a 45° C. aqueous solution containing 6 wt % $HNO_3$ and 5 wt % $H_2SO_4$, preferably has a glass component extraction amount per unit surface area of 0.025 mg/cm² or less. In the case where the glass component extraction amount is 0.025 mg/cm² or less, this glass has satisfactory acid resistance. The glass component extraction amount thereof is more preferably 0.020 mg/cm² or less; the smaller the glass component extraction amount, the more the glass is preferred.

In the case where an alkali-free glass having an increased $B_2O_3$ content is produced by melting raw materials for glass in a melting tank by heating with a burner or the like, the production efficiency is low because $B_2O_3$ volatilizes in a large amount during the melting of the raw materials for glass.

Meanwhile, electric melting in which a voltage is applied directly to the molten glass from an electrode within the melting tank to melt the raw materials for glass by the resultant Joule's heat is effective in reducing $B_2O_3$ volatilization because a cold top layer is formed on the mass of molten glass (JP-A-5-163024).

However, alkali-free glasses having a reduced dielectric dissipation factor tend to have an increased resistance value in a melting temperature range. If an alkali-free glass has a high resistance value at temperatures within the melting temperature range, the difference in resistance value between the glass and the furnace material constituting the melting tank main body is smaller and there are cases where a current flows also through the furnace material constituting the wall surface of the melting tank. The flowing of the current through the furnace material poses problems such as inhibition of the melting of the raw materials for glass, erosion of the furnace material, increase in electric power consumption, and increase in production cost (International Publication WO 2019/004434). In addition, the flowing of the current through the furnace material results in a possibility that some of the furnace material might be destroyed and come into the glass to give glass products having inclusions.

In view of such problems, the alkali-free glass according to this embodiment preferably has a resistance value at 1,500° C. of 400 Ω·cm or less. In the case where the resistance value at 1,500° C. thereof is within that range, raw materials for glass can be melted by heating by voltage application in glass production. The resistance value at 1,500° C. thereof is more preferably 300 Ω·cm or less, still more preferably 250 Ω·cm or less, yet still more preferably 200 Ω·cm or less. Although there is no particular lower limit, the resistance value at 1,500° C. thereof is 10 Ω·cm or higher.

The alkali-free glass according to this embodiment, in the form of a glass substrate having a plate thickness of 1 mmt, preferably has a haze of 1.0% or less. Thus, the glass has high evenness and in the case where the glass substrate is, for example, cleaned with an acid, the substrate surface can be satisfactorily prevented from coming to have local irregularities. Thus, the transmission loss of high-frequency signals can be reduced. The haze of the alkali-free glass according to this embodiment which is in the form of a glass substrate having a plate thickness of 1 mint is more preferably 0.8% or less, still more preferably 0.5% or less, most preferably 0.4% or less; the lower the haze, the more the glass is preferred.

Due to the features described above, the alkali-free glass according to this embodiment is suitable for use in or as glass substrates for high-frequency devices, panel antennas, window glasses, window glasses for vehicles, cover glasses for touch panels, etc.

The FIGURE is a cross-sectional diagram illustrating one example of the configuration of a circuit board for high-frequency devices. The circuit board 1 illustrated in The FIGURE includes a glass substrate 2 having insulating properties, a first wiring layer 3 formed on a first principal surface 2a of the glass substrate 2, and a second wiring layer 4 formed on a second principal surface 2b of the glass substrate 2. The first and second wiring layers 3 and 4 form a microstrip line as one example of transmission lines. The first wiring layer 3 constitutes a signal line, and the second wiring layer 4 constitutes a ground line. However, the structures of the first and second wiring layers 3 and 4 are not limited to these. The wiring layers may have been formed on only one principal surface of the glass substrate 2.

The first and second wiring layers 3 and 4 are layers each constituted of a conductor and have a thickness of usually about 0.1-50 μm. The conductors constituting the first and second wiring layers 3 and 4 are not particularly limited. For example, use is made of a metal such as steel, gold, silver, aluminum, titanium, chromium, molybdenum, tungsten, platinum, or nickel, an alloy or metal compound containing at least one of these metals, etc. The structures of the first and second wiring layers 3 and 4 are not limited to single-layer structures, and the first and second wiring layers 3 and 4 may have a multilayer structure such as, for example, a multilayer structure composed of a titanium layer and a copper layer. Methods for forming the first and second wiring layers 3 and 4 are not particularly limited, and any of various known formation method can be used, such as, for example, a printing method in which a conductor paste is used, dipping, plating, vapor deposition, and sputtering.

In the case where a glass substrate including the alkali-free glass according to this embodiment is used as the glass substrate 2, this glass substrate 2 has a dielectric dissipation factor (tan δ) at 35 GHz of 0.006 or less. The glass substrate 2 preferably has a relative permittivity at 35 GHz of 10 or less. Since the dielectric dissipation factor at 35 GHz of the glass substrate 2 is 0.006 or less, the dielectric loss in a high-frequency range above 30 GHz can be reduced. In addition, when the relative permittivity at 35 GHz of the glass substrate 2 is 10 or less, this is also effective in reducing the dielectric loss in the high-frequency range. The dielectric dissipation factor at 35 GHz of the glass substrate 2 is more preferably 0.0054 or less, still more preferably 0.005 or less, yet still more preferably 0.0045 or less, particularly preferably 0.004 or less, especially preferably 0.003 or less. The relative permittivity at 35 GHz of the glass substrate 2 is more preferably 7 or less, still more preferably 6 or less, especially preferably 5 or less.

The glass substrate 2 has the principal surfaces 2a and 2b and an edge surface. At least one of the principal surfaces 2a and 2b of the glass substrate 2, where the first and second wiring layers 3 and 4 are formed, preferably has a surface roughness of 1.5 nm or less in terms of arithmetic mean roughness Ra. More preferably, both principal surfaces have an arithmetic mean roughness Ra of 1.5 nm or less. Due to this, even in the case where a skin effect occurs in the first and second wiring layers 3 and 4 in a high-frequency range above 30 GHz, the skin resistance of the first and second wiring layers 3 and 4 can be reduced, thereby reducing the conductor loss. The arithmetic mean roughness Ra of the principal surfaces 2a and 2b of the glass substrate 2 is more preferably 1.0 nm or less, still more preferably 0.5 nm or less. The term "principal surface of the glass substrate 2" means a surface where a wiring layer is formed. In the case where wiring layers are to be formed on one of the principal surfaces, it is only required that the arithmetic mean roughness Ra of this principal surface is 1.5 nm or less. The term "surface roughness Ra" in this description means a value according to JIS B0601 (year 2001).

The surface roughness of the principal surfaces 2a and 2b of the glass substrate 2 can be attained by subjecting the surfaces of the glass substrate 2 to a polishing treatment, etc. according to need. For the polishing treatment of the surfaces of the glass substrate 2, use can be made, for example, of: polishing in which a polishing material including cerium oxide, colloidal silica, or the like as a main component and a polishing pad are used; polishing in which a polishing slurry including both a polishing material and an acidic or alkaline dispersion medium and a polishing pad are used; and polishing in which an acidic or alkaline etchant is used. These polishing treatments are used in accordance with the surface roughness of the precursor of the glass substrate 2; for example, preliminary polishing and finish polishing may be used in combination. It is preferable that the edge surfaces of the glass substrate 2 are chamfered in order to prevent the glass substrate 2, during processing, from suffering any of breakage, cracking, and chipping which are causative of the edge surfaces. The mode of chamfering may be any of C-chamfering, R-chamfering, light-chamfering, etc.

Due to the use of this glass substrate 2, the transmission loss of the circuit board 1 at 35 GHz can be reduced, specifically to 1 dB/cm or below. Consequently, the properties, including quality and intensity, of high-frequency signals are maintained. In particular, the properties of high-frequency signals having frequencies exceeding 30 GHz, especially 35 GHz and higher, are maintained. It is hence possible to provide a glass substrate 2 and a circuit board 1 that are suitable for high-frequency devices in which such high-frequency signals are handled. That is, the properties and quality of high-frequency devices in which such high-frequency signals are handled can be improved. The transmission loss at 35 GHz of the circuit board 1 is more preferably 0.5 dB/cm or less.

The shape of the glass plate including the alkali-free glass according to this embodiment is not particularly limited. However, the thickness thereof is preferably 0.7 mm or less. In the case where the thickness of the glass plate is 0.7 mm or less, this glass plate, when used as a glass substrate for high-frequency devices, makes it possible to attain thickness or size reductions in the high-frequency devices, an improvement in production efficiency, etc. Furthermore, this glass plate has an improved ultraviolet transmittance to bring about heightened productivity when an ultraviolet-curable material is used in device production steps. The thickness of the glass plate is more preferably 0.6 mm or less, still more preferably 0.5 mm or less, yet still more preferably 0.4 mm or less, particularly preferably 0.3 mm or less, in particular 0.2 mm or less, especially preferably 0.1 mm or less. A lower limit thereof is about 0.01 mm.

In the case where the glass plate is to be used as a large substrate, at least one side thereof has a dimension of preferably 900 mm or longer, more preferably 1,000 mm or longer. Although there is no particular upper limit, the dimension of each side is usually 4,000 mm or less. The glass plate preferably has a rectangular shape.

Next, a process for producing the glass plate including the alkali-free glass is explained. The glass plate is produced through a melting step in which raw materials for glass are heated to obtain a molten glass, a refining step in which bubbles are removed from the molten glass, a forming step in which the molten glass is formed into a plate shape to obtain a glass ribbon, and an annealing step in which the glass ribbon is gradually cooled to a room-temperature state. Alternatively, use may be made of a method in which the molten glass is formed into a block shape, annealed, and then subjected to cutting and polishing to thereby produce a glass plate.

In the melting step, raw materials are prepared so as to result in a desired glass composition. The raw materials are continuously introduced into a melting furnace and heated to preferably about 1,450° C.-1,750° C. to obtain a molten glass. Since the alkali-free glass according to this embodiment has a low resistance value at temperatures for melting the raw materials for glass, for example, at around 1,500° C., it is preferred to use an electric melting furnace as the melting furnace to melt the glass by heating by voltage application. However, the heating by voltage application may be used in combination with heating by a burner.

Usable as the raw materials are oxides, carbonates, nitrates, hydroxides, halides such as chlorides, etc. In the case where the melting and refining steps include a step in which the molten glass comes into contact with platinum, fine platinum particles are sometimes released into the molten glass and undesirably come as a foreign substance into the glass plate being obtained. Use of raw-material nitrates has the effect of inhibiting the inclusion of platinum as a foreign substance.

Usable as the nitrates are strontium nitrate, barium nitrate, magnesium nitrate, calcium nitrate, etc. It is more preferred to use strontium nitrate. With respect to the particle size of the raw materials, use can suitably be made of raw materials ranging from a raw material composed of particles which have a large particle diameter of several hundred micrometers but do not remain undissolved to a raw material composed of particles which have a small particle diameter of about several micrometers and which neither fly off when conveyed nor aggregate to form secondary particles. It is also possible to use granules. The water content of each raw material can be suitably regulated in order to prevent the raw material from flying off. The melting conditions regarding β-OH value and the degree of oxidation-reduction of Fe (redox [$Fe^{2+}/(Fe^{2+}+Fe^{3+})$]) can be suitably regulated.

The next refining step is a step for removing bubbles from the molten glass obtained in the melting step. In the refining step, a method of degassing by depressurization may be used, or degassing may be conducted by heating the molten glass to a temperature higher than the temperature used for melting the raw materials. Furthermore, $SO_3$ or $SnO_2$ can be used as a refining agent. Preferred $SO_3$ sources are sulfates of at least one element selected from Al, Na, K, Mg, Ca, Sr, and Ba. More preferred are sulfates of alkaline-earth metals. Of these, $CaSO_4.2H_2O$, $SrSO_4$, and $BaSO_4$ are especially preferred because these sulfates are highly effective in enlarging bubbles.

As a refining agent in the method of degassing by depressurization, it is preferred to use a halogen such as Cl or F. Preferred Cl sources are chlorides of at least one element selected from Al, Mg, Ca, Sr, and Ba. More preferred are chlorides of alkaline-earth metals. Of these, $SrCl_2.6H_2O$ and $BaCl_2.2H_2O$ are especially preferred because these chlorides are highly effective in enlarging bubbles and have low deliquescence. Preferred F sources are fluorides of at least one element selected from Al, Na, K, Mg, Ca, Sr, and Ba. More preferred are fluorides of alkaline-earth metals. Of these, $CaF_2$ is still more preferred because this fluoride is highly effective in enhancing the meltability of raw materials for glass.

Tin compounds represented by $SnO_2$ evolve $O_2$ gas in glass melts. In glass melts, $SnO_2$ is reduced to SnO at temperatures not lower than 1,450° C. to evolve $O_2$ gas and thereby function to grow the bubbles. In producing glass plates, raw materials for glass are melted by heating to about 1,450 to 1,750° C. and, hence, the bubbles in the glass melt are more effectively enlarged. In the case of using $SnO_2$ as a refining agent, it is preferred to prepare raw materials so that a tin compound is contained therein in an amount of 0.01% or larger in terms of $SnO_2$ content based on the whole base composition, which is taken as 100%. In the case where the content of $SnO_2$ is 0.01% or higher, a refining action is obtained in melting the raw materials for glass; such $SnO_2$ contents are hence preferred. The content of $SnO_2$ is more preferably 0.05% or higher, still more preferably 0.10% or higher. In the case where the content of $SnO_2$ is 0.3% or less, the glass is inhibited from coloring or devitrifying, and such $SnO_2$ contents are hence preferred. The content of the tin compound in the glass, in terms of $SnO_2$ content based on the whole base glass composition, which is taken as 100%, is more preferably 0.25% or less, still more preferably 0.2% or less, especially preferably 0.15% or less.

The next forming step is a step in which the molten glass from which bubbles have been removed in the refining step is formed into a plate shape to obtain a glass ribbon. In the forming step, use can be made of a known method for forming a glass into a plate shape, such as, for example, a float process in which a molten glass is poured onto a molten metal, e.g., tin, and thereby formed into a plate shape to obtain a glass ribbon, an overflow downdraw process (fusion process) in which a molten glass is caused to flow downward from a trough member, or a slit downdraw process in which a molten glass is caused to flow down through a slit. Of these, the float process or the fusion process is preferred from the standpoint of no need of polishing or need of only slight polishing.

Next, the annealing step is a step in which the glass ribbon obtained in the forming step is cooled to a room-temperature state under controlled cooling conditions. In the annealing step, the glass is cooled so as to result in a glass ribbon and further cooled gradually to a room-temperature state under given conditions. The annealed glass ribbon is cut to obtain a glass plate.

In case where the cooling rate R in the annealing step is too high, the cooled glass is prone to have a strain remaining therein. In addition, the too high cooling rate R results in too high an equivalent cooling rate, which is a parameter that reflects fictive temperature, making it impossible to diminish the shrinking of the glass. It is therefore preferred to set the R so that the equivalent cooling rate is 800° C./min or less. The equivalent cooling rate is more preferably 400° C./min or less, still more preferably 100° C./min or less, especially preferably 50° C./min or less. Meanwhile, in case where the cooling rate is too low, the step requires too long a time period, resulting in a decrease in productivity. It is therefore preferred to set the cooling rate at 0.1° C./or higher. The cooling rate is more preferably 0.5° C./min or higher, still more preferably 1° C./min or higher.

A definition of the equivalent cooling rate and an evaluation method therefor are as follows. A glass having a given composition is processed into a rectangular parallelepiped having dimensions of 10 mm×10 mm×0.3-2.0 mm to obtain glass specimens. The glass specimens are held for 5 minutes at a temperature of [strain point]+1,700° C. using an infra-red-heating electric furnace and then cooled to room temperature (25° C.). This cooling is conducted using different cooling rates ranging from 10° C./min to 1,000° C./min, thereby producing a plurality of glass samples.

Using a precision refractometer (e.g., KPR2000, manufactured by Shimadzu Device Corp.), the plurality of glass samples are examined for refractive index nd for d-line (wavelength, 587.6 nm). For the examination, a V-block method or a minimum deviation method may be used. The obtained values of na are plotted against the logarithm of cooling rate, thereby obtaining a cooling rate/na calibration curve.

Next, a glass having the same composition which has been actually produced through the steps of melting, forming, cooling, etc. is examined for na by the examination method shown above. A cooling rate corresponding to the obtained nd (in this embodiment, the cooling rate is referred to as "equivalent cooling rate") is determined from the calibration curve.

The present invention is not limited to the embodiment described above. Modifications, improvements, etc. are permissible so long as the object of the present invention can be achieved. For example, in producing the glass plate according to this embodiment, a molten glass may be directly formed into a plate shape by a press forming method.

In producing the glass plate according to this embodiment, a crucible made of platinum or an alloy including platinum as a main component (hereinafter referred to as "platinum crucible") may be used as a melting tank or a refining tank in addition to the production method in which a melting tank made of a refractory is used. In a melting step in the case of using a platinum crucible, raw materials are prepared so as to result in the composition of a glass plate to be obtained, and the platinum crucible containing the raw materials is heated in an electric furnace preferably to about 1,450-1,700° C. A platinum stirrer is inserted thereinto to stir the contents for 1-3 hours, thereby obtaining a molten glass.

In a forming step in steps for glass plate production using the platinum crucible, the molten glass may be poured, for example, onto a carbon plate or into a mold to form the glass into a plate shape or a block shape. In an annealing step, the molten glass is held typically at a temperature of about Tg+50° C., subsequently cooled to around the strain point at about 1-10° C./min, and then cooled to a room-temperature state at such a cooling rate that no strain remains in the glass. The cooled glass is cut into a given shape and polished to obtain a glass plate. The glass plate obtained by cutting may be heated to, for example, about Tg+50° C. and then gradually cooled to a room-temperature state at a given cooling rate. Thus, the equivalent cooling temperature of the glass can be regulated.

The circuit board 1 in which the alkali-free glass according to this embodiment is used as the glass substrate 2 is suitable for high-frequency devices in which high-frequency signals are handled, in particular, high-frequency signals having frequencies exceeding 30 GHz, especially 35 GHz and higher, are handled. This circuit board 1 can attain a reduction in the transmission loss of such high-frequency signals to improve the properties, including quality and intensity, of the high-frequency signals. The circuit board 1 in which the alkali-free glass according to this embodiment is used as the glass substrate 2 is suitable for high-frequency devices (electronic devices) such as, for example, semiconductor devices for use in communication appliances such as portable telephones, smartphones, portable digital assistants, and Wi-Fi appliances, surface acoustic wave (SAW) devices, radar components such as radar transceivers, antenna components such as liquid-crystal antennas and panel antennas, etc.

That is, the present invention relates to a glass substrate for high-frequency devices which includes the alkali-free glass according to this embodiment and also to a panel antenna including the alkali-free glass according to this embodiment.

Furthermore, the alkali-free glass according to this embodiment of the present invention can be advantageously used in other products for the purpose of reducing the transmission loss of high-frequency signals. Specifically, the present invention furthermore relates to a window glass, a window glass for vehicles, and a cover glass for touch panels, which each include the alkali-free glass.

The glass plate including the alkali-free glass can stably transmit radio waves having frequencies in a high-frequency band and is less apt to be damaged or break. This glass plate is hence suitable also for use as a window glass, a window glass for vehicles, and a cover glass for touch panels. The window glass for vehicles is, for example, more preferably a window glass for autonomous vehicles.

EXAMPLES

The present invention is described in greater detail below by referring to Examples, but the present invention is not limited to these Examples. Examples 1 to 43 and 49 to 61 are working examples according to the present invention and Examples 44 to 48 are comparative examples.

Examples 1 to 61

Glass plates respectively having the compositions (in terms of mol % on an oxide basis) shown in Tables 1 to 5, 11, and 12 were prepared, the glass plates each having a thickness of 1.0 mm, a shape of 50×50 mm, and a principal-surface arithmetic mean roughness Ra of 1.0 nm. The glass plates were each produced by a melting method using a platinum crucible. Raw materials including silica sand were mixed so as to obtain glasses respectively having the compositions shown in Tables 1 to 5, 11, and 12 to prepare 1-kg batches. The raw materials of each batch were put in the platinum crucible and melted by heating in an electric furnace at a temperature of 1,650° C. for 3 hours to obtain a molten glass. In melting the raw materials, a platinum stirrer was inserted into the platinum crucible and the contents were stirred for 1 hour to homogenize the glass. The molten glass was poured onto a carbon plate and formed into a plate shape. Thereafter, the plate-shaped glass was introduced into an electric furnace having a temperature of about Tg+50° C. and held therein for 1 hour. The temperature of the electric furnace was lowered to Tg−100° C. at a cooling rate of 1° C./min, and the electric furnace was then allowed to cool until the glass was cooled to room temperature. Thereafter, the glass was shaped into a plate by cutting and polishing to obtain a glass plate.

With respect to the glass plates of Examples 1 to 48, Tables 6 to 12 show the following properties: average coefficient of thermal expansion at 50-350° C., density, glass transition temperature, Young's modulus, specific modulus, $T_2$, $T_4$, β-OH value, relative permittivity at 10 GHz or 35 GHz, dielectric dissipation factor at 10 GHz or 35 GHz, surface devitrification temperature, acid resistance, haze, and resistivity at 1,500° C. Haze is an index to phase separation in the glass. Each blank in the tables indicates that the property was not determined.

Methods used for determining the properties are shown below.

(Density)

A mass of glass weighing about 20 g and containing no bubbles was examined for density by the Archimedes method.

(Average Coefficient of Thermal Expansion)

A differential thermodilatometer was used to make a measurement by the method as provided for in JIS R3102 (year 1995). The measurement was made over the temperature range of 50–350° C., and the average coefficient of thermal expansion is shown using ppm/° C. or ×10$^{-7}$/° C. as unit.

(Glass Transition Temperature)

Glass transition temperature was measured by thermodilatometry in accordance with the method as provided for in JIS R3103-3 (year 2001).

(Young's Modulus)

A glass having a thickness of 0.5-10 mm was examined by an ultrasonic pulse method in accordance with the method as provided for in JIS Z2280 (year 1993). The Young's modulus is shown using GPa as unit.

(Specific Modulus)

Specific modulus (GPa·cm³/g) was calculated by dividing the Young's modulus determined by the method shown above by the density determined by the method shown above.

($T_2$)

A rotary viscometer was used to measure the viscosity by the method as provided for in ASTM C 965-96, and a temperature $T_2$ (° C.) at which the viscosity was $10^2$ d·Pa·s was measured.

($T_4$)

A rotary viscometer was used to measure the viscosity by the method as provided for in ASTM C 965-96, and a temperature $T_4$ (° C.) at which the viscosity was $10^4$ d·Pa·s was measured.

(Relative Permittivity, Dielectric Dissipation Factor)

A cavity resonator and a vector network analyzer were used to make a measurement by the method as provided for in JIS R1641 (year 2007). The measurement was made at a frequency of 10 GHz or 35 GHz, which was the air resonance frequency of the cavity resonator.

(Surface Devitrification Temperature)

A glass was crushed and classified with test sieves so as to result in particle diameters ranging from 2 to 4 mm. The obtained glass cullet was subjected to 5-minute ultrasonic cleaning in isopropyl alcohol, washed with ion-exchanged water, subsequently dried, put on platinum dishes, and heat-treated for 17 hours in electric furnaces having constant temperatures. The heat-treatment temperatures were set at intervals of 10° C.

After the heat treatment, the glass was removed from the platinum dishes and examined with an optical microscope to determine a maximum temperature which had resulted in crystal precipitation in the glass surface and a minimum temperature which had not resulted in crystal precipitation.

The measurement for determining the maximum temperature which had resulted in crystal precipitation in the glass surface and that for determining the minimum temperature which had not resulted in crystal precipitation were each made once. (If it is difficult to assess crystal precipitation, there are cases where the measurement is made twice.)

An average value was determined from the maximum temperature which had resulted in crystal precipitation in the glass surface and the minimum temperature which had not resulted in crystal precipitation, and taken as the surface devitrification temperature.

(Acid Resistance)

A glass sample was immersed in an aqueous acid solution (6 mass % $HNO_3$+5 mass % $H_2SO_4$; 45° C.) for 170 seconds and evaluated for glass component extraction amount per unit surface area (mg/cm²). In the case where the glass component extraction amount is 0.02 mg/cm² or less, this glass has satisfactory acid resistance.

(β-OH Value)

A glass sample was examined for absorbance for light having wavelengths of 2.75-2.95 μm, and a maximum absorbance $β_{max}$ was divided by the thickness (mm) of the sample to determine the β-OH value.

(Resistivity at 1,500° C.)

A molten glass was examined for resistivity in the temperature range of 1,350-1,700° C. The molten glass was obtained by mixing raw materials so as to result in each of the given compositions and melting the raw-material mixture at a temperature of 1,650° C. using a platinum crucible. In melting the glass, a platinum stirrer was used to stir the contents to homogenize the glass. Next, the molten glass kept being held at a temperature of 1,500° C. was examined for resistivity by the method described in the following document.

"Method for Measuring Electrical Conductivity of Ionic Melt; OHTA Yoshio, MIYANAGA Hikaru, MORINAGA Kenji, YANAGASE Tsutomu; *Nihon Kinzoku Gakkai-shi*, Vol. 45, No. 10 (1981), 1036-1043"

(Haze)

Using a hazeometer (Type HZ-V3 Hazemeter, manufactured by Suga Test Instruments Co., Ltd.), a glass was examined for haze. The haze measurement was made on a glass plate which had a plate thickness of 1 mint and in which both surfaces had been mirror-polished. In the case where the haze was 35% or less, this glass was regarded as acceptable.

TABLE 1

| mol % | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| $SiO_2$ | 64.0 | 63.5 | 63.9 | 61.0 | 61.9 | 63.3 | 63.0 | 63.5 | 63.3 | 63.5 |
| $Al_2O_3$ | 9.0 | 9.5 | 9.0 | 9.0 | 8.0 | 8.5 | 9.5 | 9.5 | 9.5 | 9.5 |
| $B_2O_3$ | 18.5 | 18.5 | 19.0 | 21.9 | 19.0 | 19.5 | 18.5 | 18.5 | 17.5 | 16.5 |
| MgO | 4.0 | 2.5 | 2.5 | 4.0 | 4.0 | 2.5 | 3.5 | 3.0 | 3.0 | 3.0 |
| CaO | 3.5 | 3.5 | 3.5 | 3.0 | 2.0 | 3.5 | 3.5 | 3.5 | 3.5 | 4.0 |
| SrO | 0.8 | 2.3 | 1.8 | 0.8 | 1.0 | 2.3 | 1.8 | 1.8 | 2.8 | 3.3 |
| BaO | 0.2 | 0.2 | 0.2 | 0.2 | 4.0 | 0.2 | 0.2 | 0.2 | 0.2 | 0.2 |
| ZnO | 0.0 | 0.0 | 0.0 | 0.0 | 0.1 | 0.0 | 0.0 | 0.0 | 0.0 | 0.0 |
| $Na_2O$ | 0.0 | 0.0 | 0.1 | 0.0 | 0.0 | 0.1 | 0.0 | 0.0 | 0.2 | 0.0 |
| $K_2O$ | 0.0 | 0.0 | 0.0 | 0.1 | 0.0 | 0.1 | 0.0 | 0.0 | 0.0 | 0.0 |
| $Fe_2O_3$ | 0.0 | 0.0 | 0.0 | 0.0 | 0.0 | 0.0 | 0.0 | 0.0 | 0.0 | 0.0 |
| Total | 100.0 | 100.0 | 100.0 | 100.0 | 100.0 | 100.0 | 100.0 | 100.0 | 100.0 | 100.0 |
| MgO + CaO + SrO + BaO | 8.5 | 8.5 | 8.0 | 8.0 | 11.0 | 8.5 | 9.0 | 8.5 | 9.5 | 10.5 |
| $R_2O$ | 0.0 | 0.0 | 0.1 | 0.1 | 0.0 | 0.2 | 0.0 | 0.0 | 0.2 | 0.0 |
| $Al_2O_3/B_2O_3$ | 0.49 | 0.51 | 0.47 | 0.43 | 0.42 | 0.44 | 0.51 | 0.51 | 0.54 | 0.58 |
| $Al_2O_3$—(MgO + CaO + SrO + BaO) | 0.50 | 1.00 | 1.00 | 1.00 | −3.00 | 0.00 | 0.50 | 1.00 | 0.00 | −1.00 |
| SrO/(MgO + CaO + SrO + BaO) | 0.09 | 0.27 | 0.23 | 0.10 | 0.09 | 0.27 | 0.20 | 0.21 | 0.29 | 0.31 |

TABLE 2

| mol % | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| $SiO_2$ | 63.5 | 64.0 | 64.5 | 62.0 | 62.0 | 62.5 | 62.5 | 62.0 | 62.0 | 63.5 |
| $Al_2O_3$ | 9.5 | 10.0 | 9.5 | 11.0 | 11.0 | 11.0 | 11.0 | 11.0 | 11.0 | 8.5 |
| $B_2O_3$ | 15.5 | 17.0 | 17.0 | 17.0 | 17.0 | 17.0 | 17.0 | 17.0 | 17.0 | 20.0 |
| MgO | 3.5 | 1.0 | 1.0 | 3.0 | 3.0 | 3.0 | 3.0 | 4.0 | 5.0 | 6.0 |
| CaO | 4.5 | 6.0 | 6.0 | 5.6 | 5.9 | 5.4 | 6.1 | 4.9 | 3.9 | 1.0 |
| SrO | 3.3 | 2.0 | 2.0 | 0.2 | 0.2 | 0.2 | 0.2 | 0.2 | 0.2 | 0.8 |
| BaO | 0.2 | 0.0 | 0.0 | 1.2 | 0.9 | 0.9 | 0.2 | 0.9 | 0.9 | 0.2 |
| ZnO | 0.0 | 0.0 | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 | 0.0 | 0.0 |
| $Fe_2O_3$ | 0.0 | 0.0 | 0.0 | 0.0 | 0.0 | 0.0 | 0.0 | 0.0 | 0.0 | 0.0 |
| Total | 100.0 | 100.0 | 100.0 | 100.0 | 100.0 | 100.0 | 100.0 | 100.0 | 100.0 | 100.0 |
| MgO + CaO + SrO + BaO | 11.5 | 9.0 | 9.0 | 10.0 | 10.0 | 9.5 | 9.5 | 10.0 | 10.0 | 8.0 |
| $R_2O$ | 0.0 | 0.0 | 0.0 | 0.0 | 0.0 | 0.0 | 0.0 | 0.0 | 0.0 | 0.0 |
| $Al_2O_3/B_2O_3$ | 0.61 | 0.59 | 0.56 | 0.65 | 0.65 | 0.65 | 0.65 | 0.65 | 0.65 | 0.43 |
| $Al_2O_3$—(MgO + CaO + SrO + BaO) | −2.00 | 1.00 | 0.50 | 1.00 | 1.00 | 1.50 | 1.50 | 1.00 | 1.00 | 0.50 |
| SrO/(MgO + CaO + SrO + BaO) | 0.29 | 0.22 | 0.22 | 0.02 | 0.02 | 0.02 | 0.02 | 0.02 | 0.02 | 0.10 |

TABLE 3

| mol % | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| $SiO_2$ | 64.0 | 63.0 | 63.2 | 63.4 | 63.6 | 62.9 | 62.4 | 63.0 | 62.5 | 61.9 |
| $Al_2O_3$ | 9.5 | 10.0 | 8.5 | 8.3 | 8.1 | 8.3 | 8.3 | 8.5 | 8.5 | 8.5 |
| $B_2O_3$ | 17.0 | 17.0 | 20.0 | 20.0 | 20.0 | 20.0 | 20.0 | 20.0 | 20.0 | 21.1 |
| MgO | 8.0 | 8.0 | 7.0 | 7.0 | 7.0 | 7.0 | 7.0 | 7.0 | 7.0 | 0.2 |
| CaO | 0.5 | 1.0 | 0.3 | 0.3 | 0.3 | 0.8 | 1.3 | 0.2 | 0.2 | 0.2 |
| SrO | 0.8 | 0.8 | 0.8 | 0.8 | 0.8 | 0.8 | 0.8 | 0.2 | 0.2 | 7.0 |
| BaO | 0.2 | 0.2 | 0.2 | 0.2 | 0.2 | 0.2 | 0.2 | 1.1 | 1.6 | 1.1 |
| ZnO | 0.0 | 0.0 | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 | 0.0 | 0.0 |
| $Fe_2O_3$ | 0.0 | 0.0 | 0.0 | 0.0 | 0.0 | 0.0 | 0.0 | 0.0 | 0.0 | 0.0 |
| Total | 100.0 | 100.0 | 100.0 | 100.0 | 100.0 | 100.0 | 100.0 | 100.0 | 100.0 | 100.0 |
| MgO + CaO + SrO + BaO | 9.5 | 10.0 | 8.3 | 8.3 | 8.3 | 8.8 | 9.3 | 8.5 | 9.0 | 8.5 |
| $R_2O$ | 0.0 | 0.0 | 0.0 | 0.0 | 0.0 | 0.0 | 0.0 | 0.0 | 0.0 | 0.0 |

TABLE 3-continued

| mol % | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| $Al_2O_3/B_2O_3$ | 0.56 | 0.59 | 0.43 | 0.42 | 0.41 | 0.42 | 0.42 | 0.43 | 0.43 | 0.40 |
| $Al_2O_3 - (MgO + CaO + SrO + BaO)$ | 0.00 | 0.00 | 0.20 | 0.00 | −0.20 | −0.50 | −1.00 | 0.00 | −0.50 | 0.00 |
| $SrO/(MgO + CaO + SrO + BaO)$ | 0.08 | 0.08 | 0.10 | 0.10 | 0.10 | 0.09 | 0.09 | 0.02 | 0.02 | 0.82 |

TABLE 4

| mol % | Ex. 31 | Ex. 32 | Ex. 33 | Ex. 34 | Ex. 35 | Ex. 36 | Ex. 37 | Ex. 38 | Ex. 39 | Ex. 40 |
|---|---|---|---|---|---|---|---|---|---|---|
| $SiO_2$ | 62.9 | 63.0 | 61.9 | 61.9 | 62.4 | 62.4 | 62.8 | 61.9 | 62.3 | 61.9 |
| $Al_2O_3$ | 10.0 | 10.0 | 9.0 | 8.5 | 8.9 | 11.0 | 8.5 | 9.4 | 9.0 | 9.0 |
| $B_2O_3$ | 17.0 | 17.0 | 21.1 | 22.0 | 21.1 | 17.0 | 21.1 | 21.1 | 21.1 | 21.1 |
| MgO | 3.4 | 6.0 | 0.6 | 0.2 | 0.2 | 0.2 | 0.2 | 0.2 | 0.2 | 0.2 |
| CaO | 0.2 | 0.2 | 0.2 | 0.2 | 0.2 | 0.2 | 0.2 | 0.2 | 0.2 | 0.2 |
| SrO | 6.2 | 0.2 | 7.0 | 7.0 | 7.0 | 8.0 | 7.0 | 7.0 | 7.0 | 7.0 |
| BaO | 0.2 | 3.6 | 0.2 | 0.2 | 0.2 | 1.2 | 0.2 | 0.2 | 0.2 | 0.6 |
| ZnO | 0.1 | 0.0 | 0.0 | 0.0 | 0.0 | 0.0 | 0.0 | 0.0 | 0.0 | 0.0 |
| $Na_2O$ | 0.0 | 0.0 | 0.0 | 0.0 | 0.0 | 0.0 | 0.0 | 0.0 | 0.0 | 0.0 |
| $K_2O$ | 0.0 | 0.0 | 0.0 | 0.0 | 0.0 | 0.0 | 0.0 | 0.0 | 0.0 | 0.0 |
| $Fe_2O_3$ | 0.0 | 0.0 | 0.0 | 0.0 | 0.0 | 0.0 | 0.0 | 0.0 | 0.0 | 0.0 |
| Total | 100.0 | 100.0 | 100.0 | 100.0 | 100.0 | 100.0 | 100.0 | 100.0 | 100.0 | 100.0 |
| MgO + CaO + SrO + BaO | 10.0 | 10.0 | 8.0 | 7.6 | 7.6 | 9.6 | 7.6 | 7.6 | 7.6 | 8.0 |
| $R_2O$ | 0.0 | 0.0 | 0.0 | 0.0 | 0.0 | 0.0 | 0.0 | 0.0 | 0.0 | 0.0 |
| $Al_2O_3/B_2O_3$ | 0.59 | 0.59 | 0.43 | 0.39 | 0.42 | 0.65 | 0.40 | 0.45 | 0.43 | 0.43 |
| $Al_2O_3 - (MgO + CaO + SrO + BaO)$ | 0.00 | 0.00 | 1.00 | 0.90 | 1.30 | 1.40 | 0.90 | 1.80 | 1.40 | 1.00 |
| $SrO/(MgO + CaO + SrO + BaO)$ | 0.62 | 0.02 | 0.88 | 0.92 | 0.92 | 0.83 | 0.92 | 0.92 | 0.92 | 0.88 |

TABLE 5

| mol % | Ex. 41 | Ex. 42 | Ex. 43 | Ex. 44 | Ex. 45 | Ex. 46 | Ex. 47 | Ex. 48 |
|---|---|---|---|---|---|---|---|---|
| $SiO_2$ | 62.4 | 62.0 | 63.0 | 66.1 | 62.0 | 61.2 | 60.0 | 68.0 |
| $Al_2O_3$ | 8.5 | 8.0 | 11.0 | 11.3 | 8.0 | 8.0 | 5.0 | 6.6 |
| $B_2O_3$ | 21.1 | 19.0 | 17.0 | 7.8 | 23.0 | 23.0 | 28.0 | 19.5 |
| MgO | 0.2 | 4.0 | 3.0 | 5.1 | 4.0 | 4.0 | 2.0 | 0.5 |
| CaO | 0.2 | 2.0 | 5.6 | 4.5 | 2.0 | 2.0 | 3.0 | 4.9 |
| SrO | 7.0 | 1.0 | 0.2 | 5.2 | 0.8 | 0.8 | 2.0 | 0.5 |
| BaO | 0.6 | 4.0 | 0.2 | 0.0 | 0.2 | 0.2 | 0.0 | 0.0 |
| ZnO | 0 | 0.0 | 0.0 | 0.0 | 0.0 | 0.0 | 0.0 | 0.0 |
| $Na_2O$ | 0 | 0.0 | 0.0 | 0.0 | 0.0 | 0.8 | 0.0 | 0.0 |
| $K_2O$ | 0 | 0.0 | 0.0 | 0.0 | 0.0 | 0.0 | 0.0 | 0.0 |
| $Fe_2O_3$ | 0 | 0.0 | 0.0 | 0.0 | 0.0 | 0.0 | 0.0 | 0.0 |
| Total | 100.0 | 100.0 | 100.0 | 100.0 | 100.0 | 100.0 | 100.0 | 100.0 |
| MgO + CaO + SrO + BaO | 8.0 | 11.0 | 9.0 | 14.8 | 7.0 | 7.0 | 7.0 | 5.9 |
| $R_2O$ | 0.0 | 0.0 | 0.0 | 0.0 | 0.0 | 0.8 | 0.0 | 0.0 |
| $Al_2O_3/B_2O_3$ | 0.40 | 0.42 | 0.65 | 1.45 | 0.35 | 0.35 | 0.18 | 0.34 |
| $Al_2O_3 - (MgO + CaO + SrO + BaO)$ | 0.50 | −3.00 | 2.00 | −3.58 | 1.00 | 1.00 | −2.00 | 0.3 |
| $SrO/(MgO + CaO + SrO + BaO)$ | 0.88 | 0.09 | 0.02 | 0.35 | 0.11 | 0.11 | 0.29 | 0.7 |

TABLE 6

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Average coefficient of thermal expansion [ppm/° C.] | 3.2 | 3.3 | 3.2 | 3.3 | 3.7 | 3.5 | 3.3 | 3.3 | 3.4 | 3.6 |
| Average coefficient of thermal expansion [×$10^{-7}$/° C.] | 32.0 | 33.0 | 32.3 | 32.9 | 37.4 | 34.8 | 33.1 | 33.1 | 33.8 | 35.8 |
| Density [g/cm$^3$] | 2.30 | 2.33 | 2.31 | 2.28 | 2.43 | 2.32 | 2.32 | 2.32 | 2.35 | 2.38 |
| Glass transition temperature [° C.] | 654 | 654 | 647 | 643 | 636 | 641 | 664 | 655 | 656 | 660 |
| Young's modulus [GPa] | 64 | 64 | 62 | 61 | 63 | 62 | 64 | 65 | 66 | 67 |
| Specific modulus | 28 | 27 | 27 | 27 | 26 | 27 | 28 | 28 | 28 | 28 |

TABLE 6-continued

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| [GPa · cm$^3$/g] | | | | | | | | | | |
| $T_2$ (Tlogη = 2) (° C.) | | 1643 | 1660 | | | | 1633 | 1641 | | |
| $T_4$ (Tlogη = 4) (° C.) | | 1245 | 1265 | | | | 1249 | 1254 | | |
| Relative permittivity @ 10 GHz | 4.6 | 4.7 | 4.7 | 4.5 | 4.9 | 4.7 | 4.7 | 4.7 | 4.8 | 4.9 |
| Relative permittivity @ 35 GHz | 4.6 | 4.7 | 4.7 | 4.6 | 4.9 | 4.7 | 4.8 | 4.8 | 4.8 | 4.9 |
| Dielectric dissipation factor @ 10 GHz | 0.0024 | 0.0026 | 0.0023 | 0.0021 | 0.0029 | 0.0023 | 0.0026 | 0.0025 | 0.0028 | 0.0030 |
| Dielectric dissipation factor @ 35 GHz | 0.0034 | 0.0036 | 0.0032 | 0.0030 | 0.0041 | 0.0033 | 0.0036 | 0.0035 | 0.0039 | 0.0042 |
| Surface devitrification temperature [° C.] | 1280 | 1240 | 1280 | 1280 | 1280 | | 1220 | 1240 | | 1260 |
| Acid resistance [mg/cm$^2$] (HNO$_3$ + H$_2$SO$_4$; 45° C.) | 0.008 | 0.007 | 0.006 | 0.014 | 0.021 | 0.018 | 0.007 | 0.007 | 0.008 | 0.003 |
| Resistivity at 1,500° C. [Ω · cm] | | 299 | | | | | | | | |
| Haze (thickness, 1.0 mmt) | <0.5 | <0.5 | <0.5 | <0.5 | <0.5 | <0.5 | <0.5 | <0.5 | <0.5 | <0.5 |
| β-OH value | 0.23 | 0.45 | | | | 0.34 | | | 0.55 | |

TABLE 7

|  | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| Average coefficient of thermal expansion [ppm/° C.] | 3.6 | 3.4 | 3.4 | 3.4 | 3.4 | 3.3 | 3.4 | 3.3 | | 3.1 |
| Average coefficient of thermal expansion [×10$^{-7}$/° C.] | 35.6 | 34.0 | 34.2 | 33.9 | 34.0 | 33.3 | 33.5 | 33.3 | | 31.1 |
| Density [g/cm$^3$] | 2.39 | 2.34 | 2.34 | 2.36 | 2.35 | 2.35 | 2.33 | 2.35 | 2.35 | 2.27 |
| Glass transition temperature [° C.] | 660 | 657 | 657 | 662 | 667 | 666 | 665 | 668 | | 655 |
| Young's modulus [GPa] | 69 | 66 | 65 | 68 | 68 | 67 | 68 | 68 | 68 | 63 |
| Specific modulus [GPa · cm$^3$/g] | 29 | 28 | 28 | 29 | 29 | 29 | 29 | 29 | 29 | 28 |
| $T_2$ (Tlogη = 2) (° C.) | | | | 1598 | | | | | | 1653 |
| $T_4$ (Tlogη = 4) (° C.) | | | | 1231 | | | | | | 1248 |
| Relative permittivity @ 10 GHz | 5.0 | 4.8 | 4.8 | 4.9 | 4.8 | 4.8 | 4.8 | 4.9 | 4.8 | 4.5 |
| Relative permittivity @ 35 GHz | 5.0 | 4.8 | 4.8 | 4.9 | 4.8 | 4.8 | 4.7 | 4.9 | 4.9 | 4.4 |
| Dielectric dissipation factor @ 10 GHz | 0.0031 | 0.0025 | 0.0028 | 0.0030 | 0.0031 | 0.0029 | 0.0028 | 0.0030 | 0.0030 | 0.0021 |
| Dielectric dissipation factor @ 35 GHz | 0.0044 | 0.0036 | 0.0039 | 0.0042 | 0.0042 | 0.0041 | 0.0041 | 0.0042 | 0.0042 | 0.0030 |
| Surface devitrification temperature [° C.] | | | | 1240 | 1240 | 1280 | 1280 | | | <1260 |
| Acid resistance [mg/cm$^2$] (HNO$_3$ + H$_2$SO$_4$; 45° C.) | 0.011 | 0.001 | 0.002 | 0.000 | 0.022 | 0.002 | 0.016 | 0.000 | 0.019 | 0.021 |
| Resistivity at 1,500° C. [Ω · cm] | | | | | | | | | | 320 |
| Haze (thickness, 1.0 mmt) | <0.5 | <0.5 | <0.5 | <0.5 | <0.5 | <0.5 | <0.5 | <0.5 | <0.5 | <0.5 |
| β-OH value | | 0.58 | | | 0.36 | | | | | |

TABLE 8

|  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| Average coefficient of thermal expansion [ppm/° C.] | | | 3.1 | 3.1 | 2.8 | | | | | 3.6 |
| Average coefficient of thermal expansion [×10$^{-7}$/° C.] | | | 31.0 | 31.2 | 28.0 | | | | | 36.2 |
| Density [g/cm$^3$] | 2.31 | 2.32 | 2.28 | 2.27 | 2.27 | 2.28 | 2.28 | 2.30 | 2.31 | 2.41 |
| Glass transition temperature [° C.] | | | 652 | 654 | 649 | | | | | |
| Young's modulus [GPa] | 67 | 68 | 62 | 63 | 62 | 63 | 63 | 63 | 62 | 59 |

TABLE 8-continued

|  | Ex. 21 | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| Specific modulus [GPa · cm$^3$/g] | 29 | 29 | 27 | 28 | 27 | 27 | 27 | 27 | 27 | 25 |
| $T_2$ (Tlogη = 2) (° C.) |  |  |  |  |  |  |  | 1641 |  | 1656 |
| $T_4$ (Tlogη = 4) (° C.) |  |  |  |  |  |  |  | 1245 |  | 1243 |
| Relative permittivity @ 10 GHz | 4.6 | 4.6 | 4.5 | 4.4 | 4.4 | 4.5 | 4.5 | 4.5 | 4.6 | 4.8 |
| Relative permittivity @ 35 GHz | 4.6 | 4.6 | 4.4 | 4.4 | 4.4 | 4.5 | 4.5 | 4.5 | 4.6 | 4.9 |
| Dielectric dissipation factor @ 10 GHz | 0.0025 | 0.0026 | 0.0021 | 0.0021 | 0.0020 | 0.0022 | 0.0022 | 0.0021 | 0.0023 | 0.0025 |
| Dielectric dissipation factor @ 35 GHz | 0.0035 | 0.0037 | 0.0029 | 0.0029 | 0.0028 | 0.0031 | 0.0031 | 0.0030 | 0.0032 | 0.0035 |
| Surface devitrification temperature [° C.] |  |  | 1250 |  |  |  |  | 1280 |  | <1080 |
| Acid resistance [mg/cm$^2$] (HNO$_3$ + H$_2$SO$_4$; 45° C.) | 0.016 | 0.016 | 0.015 | 0.015 | 0.014 | 0.018 | 0.020 | 0.014 | 0.017 | 0.013 |
| Resistivity at 1,500° C. [Ω · cm] |  |  |  |  |  |  |  |  |  | 399 |
| Haze (thickness, 1.0 mmt) | <0.5 | <0.5 | <0.5 | <0.5 | <0.5 | <0.5 | <0.5 | <0.5 | <0.5 | <0.5 |
| β-OH value |  | 0.45 |  |  |  |  | 0.67 |  |  | 0.4 |

TABLE 9

|  | Ex. 31 | Ex. 32 | Ex. 33 | Ex. 34 | Ex. 35 | Ex. 36 | Ex. 37 | Ex. 38 | Ex. 39 | Ex. 40 |
|---|---|---|---|---|---|---|---|---|---|---|
| Average coefficient of thermal expansion [ppm/° C.] |  |  | 3.6 | 3.57 | 3.57 | 3.57 | 3.51 | 3.52 | 3.4 | 3.6 |
| Average coefficient of thermal expansion [×10$^{-7}$/° C.] |  |  | 36.2 | 35.7 | 35.7 | 35.7 | 35.1 | 35.2 | 34.0 | 36.3 |
| Density [g/cm$^3$] | 2.41 | 2.41 | 2.39 | 2.36 | 2.37 | 2.45 | 2.38 | 2.39 | 2.37 | 2.39 |
| Glass transition temperature [° C.] |  |  | 633 | 625 | 634 | 664 | 631 | 624 | 625 | 622 |
| Young's modulus [GPa] | 66 | 67 | 61 | 59 | 60 | 65 | 60 | 61 | 59 | 59 |
| Specific modulus [GPa · cm$^3$/g] | 27 | 28 | 25 | 25 | 25 | 27 | 25 | 25 | 25 | 25 |
| $T_2$ (Tlogη = 2) (° C.) | 1643 |  | 1640 |  |  | 1664 | 1662 |  |  |  |
| $T_4$ (Tlogη = 4) (° C.) | 1251 |  | 1229 |  |  | 1259 | 1243 |  |  |  |
| Relative permittivity @ 10 GHz | 4.9 | 4.9 | 4.8 | 4.8 | 4.8 | 5.1 | 4.8 | 4.7 | 4.7 | 4.8 |
| Relative permittivity @ 35 GHz | 5.0 | 4.9 | 4.8 | 4.8 | 4.8 | 5.1 | 4.8 | 4.8 | 4.8 | 4.9 |
| Dielectric dissipation factor @ 10 GHz | 0.0032 | 0.0031 | 0.0025 | 0.0027 | 0.0028 | 0.0035 | 0.0025 | 0.0023 | 0.0025 | 0.0025 |
| Dielectric dissipation factor @ 35 GHz | 0.0044 | 0.0043 | 0.0035 | 0.0038 | 0.0039 | 0.0048 | 0.0039 | 0.0040 | 0.0039 | 0.0041 |
| Surface devitrification temperature [° C.] | 1240 | 1260 | 1150 | <1250 | <1250 | <1250 | 1280 | 1280 | <1250 | <1250 |
| Acid resistance [mg/cm$^2$] (HNO$_3$ + H$_2$SO$_4$; 45° C.) | 0.005 | 0.012 | 0.009 | 0.015 | 0.015 | 0.010 | 0.011 | 0.016 | 0.013 | 0.012 |
| Resistivity at 1,500° C. [Ω · cm] | 399 |  |  |  |  |  |  |  |  |  |
| Haze (thickness, 1.0 mmt) | <0.5 | <0.5 | <0.5 | <0.5 | <0.5 | <0.5 | <0.5 | <0.5 | <0.5 | <0.5 |
| β-OH value |  |  | 0.35 | 0.20 |  |  |  |  |  | 0.46 |

TABLE 10

|  | Ex. 41 | Ex. 42 | Ex. 43 | Ex. 44 | Ex. 45 | Ex. 46 | Ex. 47 | Ex. 48 |
|---|---|---|---|---|---|---|---|---|
| Average coefficient of thermal expansion [ppm/° C.] | 3.6 | 3.7 | 3.2 | 3.8 | 3.2 | 3.2 | 3.2 | 3.3 |
| Average coefficient of thermal expansion [×10$^{-7}$/° C.] | 35.7 | 37.4 | 32.3 | 38.4 | 32.0 | 32.0 | 32.0 | 33.0 |
| Density [g/cm$^3$] | 2.39 | 2.43 | 2.33 | 2.50 | 2.26 | 2.26 | 2.23 | 2.24 |
| Glass transition temperature [° C.] | 621 | 636 | 673 | 710 | 633 | 633 |  | 607 |

TABLE 10-continued

|  | Ex. 41 | Ex. 42 | Ex. 43 | Ex. 44 | Ex. 45 | Ex. 46 | Ex. 47 | Ex. 48 |
|---|---|---|---|---|---|---|---|---|
| Young's modulus [GPa] | 59 | 63 | 69 | 76 | 59 | 59 | 53 | 58 |
| Specific modulus [GPa · cm³/g] | 25 | 26 |  | 30 | 26 | 26 | 24 | 26 |
| $T_2$ (Tlogη = 2) (° C.) |  |  |  | 1645 | 1626 | 1626 | 1642 | 1743 |
| $T_4$ (Tlogη = 4) (° C.) |  |  |  | 1275 | 1231 | 1231 | 1208 | 1296 |
| Relative permittivity @ 10 GHz | 4.8 | 4.9 | 4.8 | 5.4 | 4.4 | 4.4 | 4.3 | 4.3 |
| Relative permittivity @ 35 GHz | 4.8 |  |  | 5.3 | 4.3 | 4.4 | 4.3 | 4.3 |
| Dielectric dissipation factor @ 10 GHz | 0.0024 | 0.0029 | 0.0028 | 0.0056 | 0.0018 | 0.0036 | 0.0016 | 0.0016 |
| Dielectric dissipation factor @ 35 GHz | 0.0040 |  |  | 0.0070 | 0.0026 | 0.0055 | 0.0024 | 0.0026 |
| Surface devitrification temperature [° C.] | <1250 | 1280 | >1300 | 1266 | 1220 |  |  | 1150 |
| Acid resistance [mg/cm²] (HNO₃ + H₂SO₄; 45° C.) | 0.010 | 0.024 | 0.002 | 0.000 | 0.027 | 0.027 | 0.086 | 0.026 |
| Resistivity at 1,500° C. [Ω · cm] |  |  |  | 210 | 349 | 106 |  | 612 |
| Haze (thickness, 1.0 mmt) | <0.5 | <0.5 | <0.5 | <0.5 | 0.6 | 0.6 | 1.1 | <0.5 |
| β-OH value |  | 0.035 |  |  | 0.43 | 0.45 |  |  |

TABLE 11

| mol % | Ex. 49 | Ex. 50 | Ex. 51 | Ex. 52 |
|---|---|---|---|---|
| SiO₂ | 61.3 | 61.9 | 61.9 | 61.9 |
| Al₂O₃ | 8.5 | 8.5 | 8.5 | 8.5 |
| B₂O₃ | 21.1 | 21.1 | 21.1 | 21.1 |
| MgO | 0.2 | 0.2 | 0.2 | 0.2 |
| CaO | 0.2 | 0.2 | 0.2 | 0.2 |
| SrO | 7.0 | 7.0 | 7.0 | 7.0 |
| BaO | 1.1 | 1.1 | 1.1 | 1.1 |
| ZnO | 0.0 | 0.0 | 0.0 | 0.0 |
| Na₂O | 0.0 | 0.0 | 0.0 | 0.0 |
| K₂O | 0.0 | 0.0 | 0.0 | 0.0 |
| Fe₂O₃ | 0.0 | 0.0 | 0.0 | 0.0 |
| Cl | 0.61 | 0.00 | 0.00 | 0.01 |
| Total | 100.0 | 100.0 | 100.0 | 100.0 |
| MgO + CaO + SrO + BaO | 8.5 | 8.5 | 8.5 | 8.5 |
| R₂O | 0.0 | 0.0 | 0.0 | 0.0 |
| Al₂O₃/B₂O₃ | 0.40 | 0.40 | 0.40 | 0.40 |
| Al₂O₃—(MgO + CaO + SrO + BaO) | 0.00 | 0.00 | 0.00 | 0.00 |
| SrO/(MgO + CaO + SrO + BaO) | 0.82 | 0.82 | 0.82 | 0.82 |
| β-OH value | 0.16 | 0.45 | 0.57 | 0.695 |
| Relative permittivity @ 10 GHz | 4.8 | 4.8 | 4.8 | 4.8 |
| Dielectric dissipation factor @ 10 GHz | 0.0028 | 0.0026 | 0.0025 | 0.0024 |

TABLE 12

| mol % | Ex. 53 | Ex. 54 | Ex. 55 | Ex. 56 | Ex. 57 | Ex. 58 | Ex. 59 | Ex. 60 | Ex. 61 |
|---|---|---|---|---|---|---|---|---|---|
| SiO₂ | 61.9 | 61.8 | 61.7 | 61.0 | 61.8 | 61.8 | 61.6 | 61.4 | 60.0 |
| Al₂O₃ | 8.5 | 8.5 | 8.5 | 8.5 | 8.5 | 8.5 | 8.5 | 8.5 | 8.5 |
| B₂O₃ | 21.1 | 21.1 | 21.1 | 21.1 | 21.1 | 21.1 | 21.1 | 21.1 | 21.1 |
| MgO | 0.2 | 0.2 | 0.2 | 0.2 | 0.2 | 0.2 | 0.2 | 0.2 | 0.2 |
| CaO | 0.2 | 0.2 | 0.2 | 0.2 | 0.2 | 0.2 | 0.2 | 0.2 | 0.2 |
| SrO | 7.0 | 7.0 | 7.0 | 7.0 | 7.0 | 7.0 | 7.0 | 7.0 | 7.0 |
| BaO | 1.1 | 1.1 | 1.1 | 1.1 | 1.1 | 1.1 | 1.1 | 1.1 | 1.1 |
| ZnO | 0.0 | 0.0 | 0.0 | 0.0 | 0.0 | 0.0 | 0.0 | 0.0 | 0.0 |
| Li₂O | 0.00 | 0.00 | 0.00 | 0.00 | 0.06 | 0.12 | 0.23 | 0.46 | 1.83 |
| Na₂O | 0.02 | 0.09 | 0.22 | 0.89 | 0.02 | 0.02 | 0.02 | 0.02 | 0.02 |
| K₂O | 0.0 | 0.0 | 0.0 | 0.0 | 0.0 | 0.0 | 0.0 | 0.0 | 0.0 |
| Fe₂O₃ | 0.0 | 0.0 | 0.0 | 0.0 | 0.0 | 0.0 | 0.0 | 0.0 | 0.0 |
| Total | 100.0 | 100.0 | 100.0 | 100.0 | 100.0 | 100.0 | 100.0 | 100.0 | 100.0 |
| MgO + CaO + SrO + BaO | 8.5 | 8.5 | 8.5 | 8.5 | 8.5 | 8.5 | 8.5 | 8.5 | 8.5 |
| R₂O | 0.02 | 0.09 | 0.22 | 0.89 | 0.08 | 0.14 | 0.25 | 0.48 | 1.85 |

TABLE 12-continued

| mol % | Ex. 53 | Ex. 54 | Ex. 55 | Ex. 56 | Ex. 57 | Ex. 58 | Ex. 59 | Ex. 60 | Ex. 61 |
|---|---|---|---|---|---|---|---|---|---|
| $Al_2O_3/B_2O_3$ | 0.40 | 0.40 | 0.40 | 0.40 | 0.40 | 0.40 | 0.40 | 0.40 | 0.40 |
| $Al_2O_3$—(MgO + CaO + SrO + BaO) | 0.00 | 0.00 | 0.00 | 0.00 | 0.00 | 0.00 | 0.00 | 0.00 | 0.00 |
| SrO/(MgO + CaO + SrO + BaO) | 0.82 | 0.82 | 0.82 | 0.82 | 0.82 | 0.82 | 0.82 | 0.82 | 0.82 |
| Relative permittivity @ 10 GHz | 4.8 | 4.8 | 4.9 | 4.9 | 4.9 | 4.8 | 4.8 | 4.9 | 5.0 |
| Dielectric dissipation factor @ 10 GHz | 0.0025 | 0.0027 | 0.0029 | 0.0044 | 0.0026 | 0.0025 | 0.0026 | 0.0028 | 0.0041 |
| Resistivity at 1,500 C. [Ω·cm] | 399 | 376 | 310 | 144 | 307 | 245 | 192 | 125 | 35 |

The glasses of Examples 1 to 43, which are working examples according to the present invention, gave results in which, although some properties of some of the glasses had not been determined, each of the glasses satisfied many of: an average coefficient of thermal expansion at 50-350° C. of $30\times10^{-7}$/° C. to $40\times10^{-7}$/° C., a density of 2.58 g/cm³ or less, a glass transition temperature of 700° C. or lower, a Young's modulus of 58 GPa or higher, a $T_2$ of 1,500-1,700° C., a $T_4$ of 1,290° C. or lower, a dielectric dissipation factor at 35 GHz of 0.006 or less, and a resistance value at 1,500° C. of 400 Ω·cm or less. Furthermore, it was ascertained from the results of the haze measurement that these glasses had no phase separation.

Glasses in which $Al_2O_3$—(MgO+CaO+SrO+BaO) was larger than −3 and less than 2 tended to have a surface devitrification temperature of 1,300° C. or lower and satisfactory acid resistance. Glasses in which $Al_2O_3$—(MgO+CaO+SrO+BaO) was 2 or larger tended to have a surface devitrification temperature higher than 1,300° C. Glasses in which the value of $Al_2O_3/B_2O_3$ was 0.49 or larger tended to have a high Young's modulus. Glasses in which SrO/(MgO+CaO+SrO+BaO) was 0.64 or larger tended to have a low surface devitrification temperature. The glasses in which the $B_2O_3$ content was less than 15% and the value of $Al_2O_3/B_2O_3$ was larger than 1.4 each had a dielectric dissipation factor at 35 GHz higher than 0.006 and were incapable of reducing the dielectric loss in a high-frequency range. These glasses each had a glass transition temperature higher than 700° C. Meanwhile, the glasses in which the value of $Al_2O_3/B_2O_3$ was 0.35 or smaller had poor acid resistance. These glasses were ascertained, from the results of the haze measurement, to have phase separation. The glasses in which the $B_2O_3$ content was higher than 24% and the value of $Al_2O_3/B_2O_3$ was larger than 1.4 had poor acid resistance. Furthermore, phase separation therein was ascertained from the results of the haze measurement. Moreover, these glasses each had a Young's modulus less than 58 GPa.

The glasses of Examples 49 to 52, which are working examples according to the present invention, are glasses obtained by modifying the glass composition of Example 30 as a base so as to differ in Cl content and β-OH value. The following can be seen from the Examples. It is possible that increasing the β-OH value can attain a relative reduction in dielectric dissipation factor and that increasing the Cl content results in an increase in dielectric dissipation factor.

The glasses of Examples 53 to 61, which are wording examples according to the present invention, are glasses obtained by modifying the glass composition of Example 30 as a base so as to differ in $Li_2O$ content and $Na_2O$ content. Increasing the $Li_2O$ content or $Na_2O$ content results in a decrease in resistivity at 1,500° C. $Li_2O$ can reduce the resistivity at 1,500° C. while maintaining a low dielectric dissipation factor.

While the invention has been described in detail and with reference to specific embodiments thereof, it will be apparent to one skilled in the art that various changes and modifications can be made therein without departing from the spirit and scope thereof. This application is based on a Japanese patent application filed on Apr. 12, 2019 (Application No. 2019-076423), a Japanese patent application filed on Jun. 28, 2019 (Application No. 2019-120828), and a Japanese patent application filed on Nov. 27, 2019 (Application No. 2019-214690), the contents thereof being incorporated herein by reference

INDUSTRIAL APPLICABILITY

The alkali-free glass according to this embodiment has excellent acid resistance and can reduce the dielectric loss of high-frequency signals. The glass plate including this alkali-free glass is useful as the glass substrates of the whole high-frequency devices in which high-frequency signals having frequencies exceeding 10 GHz, in particular, high-frequency signals having frequencies exceeding 30 GHz, especially 35 GHz and higher, are handled, such as, for example, communication appliances, and is useful as or in frequency filter components for SAW devices, FBARs, etc., band pass filters for waveguides, etc., SIW (substrate integrated waveguide) components, radar components, antenna components (in particular, liquid-crystal antennas, which are regarded as optimal for satellite communication), window glasses, window glasses for vehicles, etc.

REFERENCE SIGNS LIST

1: Circuit board
2: Glass substrate
2a, 2b: Principal surface
3, 4: Wiring layer

The invention claimed is:
1. An alkali-free glass, comprising:
a first glass having a composition comprising, by mole percentage based on oxides,
57 to 70% of $SiO_2$,
5 to 15% of $Al_2O_3$,
15 to 24% of $B_2O_3$,
0.2 to 1.306% of MgO,
0.1 to 1.206% of CaO,
0.533 to 2.5% of SrO,
0 to 1.106% of BaO, and
to 0.1% of ZnO;
or
a second glass having a composition comprising, by mole percentage based on oxides,
57 to 70% of $SiO_2$,
5 to 15% of $Al_2O_3$,
15 to 24% of $B_2O_3$,
0.1 to 5.425% of MgO,
0.1 to 5.425% of CaO,
0.533 to 10% of SrO,
0.1 to 5.425% of BaO, and
to 0.1% of ZnO, wherein $Al_2O_3/B_2O_3$ in the composition of the first glass and the second glass is larger than 0.35 and 1.0 or smaller, and SrO/(MgO+CaO+SrO+BaO) in the composition of the first glass and the second glass is 0.64 or larger.

2. The alkali-free glass according to claim 1, wherein the composition of the glass includes 1 mol % or less of Fe in terms of $Fe_2O_3$.

3. The alkali-free glass according to claim 1, wherein the composition of the glass includes at least one selected from the group consisting of $SnO_2$, Cl, and $SO_3$, in a total amount of 1 mol % or less.

4. The alkali-free glass according to claim 1, wherein the composition of the glass includes at least one selected from the group consisting of $Sc_2O_3$, $TiO_2$, ZnO, $Ga_2O_3$, $GeO_2$, $Y_2O_3$, $ZrO_2$, $Nb_2O_5$, $In_2O_3$, $TeO_2$, $HfO_2$, $Ta_2O_5$, $WO_3$, $Bi_2O_3$, $La_2O_3$, $Gd_2O_3$, $Yb_2O_3$, and $Lu_2O_3$, in a total amount of 1 mol % or less.

5. The alkali-free glass according to claim 1, wherein the composition of the glass includes 1 mol % or less of F.

6. The alkali-free glass according to claim 1, wherein when the first glass is present, $Al_2O_3$—(MgO+CaO+SrO+BaO) in the composition of the first glass is 1.094% or greater and less than 2%, and when the second glass is present, $Al_2O_3$—(MgO+CaO+SrO+BaO) in the composition of the second glass is larger than-3% and less than 2%.

7. The alkali-free glass according to claim 1, wherein the $Al_2O_3/B_2O_3$ in the composition of the glass is 0.49 or larger.

8. The alkali-free glass according to claim 1, wherein the composition of the glass has a total content of $Li_2O+Na_2O+K_2O$ in a range of 0 to 0.2 mol %.

9. The alkali-free glass according to claim 1, wherein the second glass is present, and MgO+CaO+SrO+BaO in the composition of the second glass is in a range of 7% to 15.625%.

10. The alkali-free glass according to claim 1, wherein the second glass is present, and MgO+CaO+SrO+BaO in the composition of the second glass is in a range of 8% to 15.625%.

11. The alkali-free glass according to claim 1, wherein the glass has a β-OH value of 0.05 $mm^{-1}$ or larger and 1.0 $mm^{-1}$ or less.

12. The alkali-free glass according to claim 1, wherein the glass has a dielectric dissipation factor at 35 GHz of 0.006 or less.

13. The alkali-free glass according to claim 1, wherein the glass has a resistance value at 1,500° C. of 400 Ω·cm or less.

14. The alkali-free glass according to claim 1, wherein the glass has a resistance value at 1,500° C. of 300 Ω·cm or less.

15. The alkali-free glass according to claim 1, wherein the glass has a Young's modulus of 58 GPa or higher.

16. The alkali-free glass according to claim 1, wherein the glass has a density of 2.58 $g/cm^3$ or less and having an average coefficient of thermal expansion in a range of $30\times10^{-7}$/° C. to $40\times10^{-7}$/° C. at 50° C. to 350° C.

17. The alkali-free glass according to claim 1, wherein the glass has a temperature $T_2$ in a range of 1.500° C. to 1.700° C. at which a glass viscosity is $10^2$ dPa·s, and has a temperature $T_4$ of 1.290° C. or lower at which a glass viscosity is $10^4$ dPa·s.

18. The alkali-free glass according to claim 1, wherein the glass has a glass transition temperature of 700° C. or lower or a strain point of 700° C. or lower.

19. The alkali-free glass according to claim 1, wherein the glass has a surface devitrification temperature of 1,300° C. or lower.

20. The alkali-free glass according to claim 1, wherein the glass has a glass component extraction amount per unit surface area of 0.025 $mg/cm^2$ or less when the alkali-free glass is immersed for 170 seconds in a 45° C. aqueous solution containing 6 wt % $HNO_3$ and 5 wt % $H_2SO_4$.

21. A glass plate, comprising:
the alkali-free glass of claim 1 formed such that the alkali-free glass has principal surfaces and an edge surface and that at least one of the principal surfaces has an arithmetic mean roughness Ra of 1.5 nm or less.

22. The glass plate according to claim 21, wherein the alkali-free glass has at least one side with a dimension of 900 mm or longer and a thickness of 0.7 mm or less.

23. The glass plate according to claim 21, wherein the glass plate is produced by a float process or a fusion process.

24. A glass substrate for high-frequency devices, comprising:
the alkali-free glass of claim 1.

25. A panel antenna, comprising:
the alkali-free glass of claim 1.

26. A window glass, comprising:
the alkali-free glass of claim 1.

27. A window glass for vehicles, comprising:
the alkali-free glass of claim 1.

28. A cover glass for touch panels, comprising:
the alkali-free glass of claim 1.

* * * * *